US012363689B2

United States Patent
Liu et al.

(10) Patent No.: US 12,363,689 B2
(45) Date of Patent: Jul. 15, 2025

(54) GAP CONFIGURATION METHOD, UE, AND NETWORK DEVICE

(71) Applicant: VIVO MOBILE COMMUNICATION CO., LTD., Dongguan (CN)

(72) Inventors: Xuanbing Liu, Dongguan (CN); Xiaodong Yang, Dongguan (CN); Wenjuan Pu, Dongguan (CN); Wei Bao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 455 days.

(21) Appl. No.: 17/969,658

(22) Filed: Oct. 19, 2022

(65) Prior Publication Data

US 2023/0037327 A1 Feb. 9, 2023

Related U.S. Application Data

(63) Continuation of application No. PCT/CN2021/089220, filed on Apr. 23, 2021.

(30) Foreign Application Priority Data

Apr. 24, 2020 (CN) .......................... 202010335447.X

(51) Int. Cl.
*H04W 72/0446* (2023.01)
*H04W 24/02* (2009.01)

(52) U.S. Cl.
CPC ....... *H04W 72/0446* (2013.01); *H04W 24/02* (2013.01)

(58) Field of Classification Search
CPC ................................................ H04W 72/0446

(Continued)

(56) References Cited

U.S. PATENT DOCUMENTS

2023/0247460 A1* 8/2023 Jin ...................... H04B 7/0413
370/252
2023/0319865 A1* 10/2023 Xu ...................... H04W 72/542
370/329

(Continued)

FOREIGN PATENT DOCUMENTS

| CN | 109413671 A | 3/2019 |
| CN | 110831053 A | 2/2020 |

(Continued)

OTHER PUBLICATIONS

International Search Report issued in corresponding International Application No. PCT/CN2021/089220, mailed Jul. 21, 2021, 6 pages.

(Continued)

*Primary Examiner* — Anthony Mejia
(74) *Attorney, Agent, or Firm* — IPX PLLC

(57) ABSTRACT

A Gap configuration method, User Equipment (UE), and a network device are provided. The Gap configuration method includes: receiving first enabling information from a network device, where the first enabling information is used to indicate whether a first need configuration of a first Gap is enabled, the first Gap is a Gap including at least one of N Gap types, and N is a positive number; sending first request information to the network device in a case that the first enabling information indicates that the first need configuration is enabled, where the first request information is used to request a first target Gap, and a Gap type of the first target Gap is at least one of the N Gap types; and receiving first configuration information from the network device, where the first configuration information is used to configure the first target Gap.

20 Claims, 10 Drawing Sheets

(58) Field of Classification Search
USPC .......................................................... 370/336
See application file for complete search history.

(56) References Cited

U.S. PATENT DOCUMENTS

| | | | |
|---|---|---|---|
| 2024/0032131 A1* | 1/2024 | Niu | H04W 24/02 |
| 2024/0056862 A1* | 2/2024 | He | H04W 72/56 |
| 2024/0214998 A1* | 6/2024 | Elshafie | H04W 72/25 |

FOREIGN PATENT DOCUMENTS

| | | |
|---|---|---|
| WO | 2019036841 A1 | 2/2019 |
| WO | 2020031122 A1 | 2/2020 |

OTHER PUBLICATIONS

MediaTek Inc., Report of [AT109e][080][TEI16] NeedForGap capability (MTK), 3GPP TSG-RAN WG2 Meeting #109e, R2-2002308, Mar. 6, 2020, 10 pages.

MediaTek Inc., Report of [108#58][TEI16] NeedForGap Signaling (MTK), 3GPP TSG-RAN WG2 Meeting #109-e, R2-2000716, Feb. 28, 2020, 15 pages.

R2-2000117, Discussion on the Rel-15 Duplication MAC CE, 3GPP TSG-RAN WG2 Meeting #109 electronic, Jan. 17, 2020, 3 pages.

\* cited by examiner

GAP CONFIGURATION METHOD, UE, AND NETWORK DEVICE

CROSS-REFERENCE TO RELATED APPLICATIONS

This application is a continuation of International Application No. PCT/CN2021/089220, filed on Apr. 23, 2021, which claims priority to Chinese Patent Application No. 202010335447.X, filed on Apr. 24, 2020. The entire contents of each of the above-identified applications are expressly incorporated herein by reference.

TECHNICAL FIELD

Embodiments of the present disclosure relate to the field of communications technologies, and in particular, to a Gap configuration method, UE, and a network device.

BACKGROUND

Terminal devices may be classified into a single-SIM terminal and a multi-SIM terminal (for example, a dual-SIM terminal). The single-SIM terminal includes a Subscriber Identity Module (SIM), and the multi-SIM terminal includes two or more SIMs. Each SIM in the terminal device may be used as one User Equipment (UE).

In a mobile communications system, a Time Division Multiplexing Pattern (TDM Pattern) such as a Gap allocation mechanism is generally used to resolve a problem of task scheduling when a resource conflict exists in the terminal device. In some embodiments, with the development of communications technologies, capabilities, tasks, and resource conflicts of terminal devices, especially multi-SIM terminals, are diversified, and therefore the terminal devices have diversified Gap needs.

However, the current Gap allocation mechanism mainly covers measurement tasks (for example, inter-frequency measurement and inter-RAT measurement), that is, it mainly resolves measurement Gap needs, but cannot resolve diversified Gap negotiation and configuration needs. Therefore, how UE requests diversified Gaps from a network device, and how the network device correspondingly allocates the diversified Gaps, that is, how to make the Gap allocation mechanism cover diversified Gap negotiation and configuration needs becomes a to-be-solved problem.

SUMMARY

Embodiments of the present disclosure provide a Gap configuration method, UE and a network device.

According to a first aspect, an embodiment of the present disclosure provides a Gap configuration method, applied to first user equipment UE and including: receiving first enabling information from a network device, where the first enabling information is used to indicate whether a first need configuration of a first Gap is enabled, the first Gap is a Gap including at least one of N Gap types, and N is a positive number; sending first request information to the network device in a case that the first enabling information indicates that the first need configuration is enabled, where the first request information is used to request a first target Gap, and a Gap type of the first target Gap is at least one of the N Gap types; and receiving first configuration information from the network device, where the first configuration information is used to configure the first target Gap.

According to a second aspect, an embodiment of the present disclosure provides a Gap configuration method, applied to a network device and including: sending first enabling information to first user equipment UE, where the first enabling information is used to indicate whether a first need configuration of a first Gap is enabled, the first Gap is a Gap including at least one of N Gap types, and N is a positive integer; receiving a first request from the first UE in a case that the first enabling information indicates that the first need configuration is enabled, where the first request is used to request a first target Gap, and a Gap type of the first target Gap is at least one of the N Gap types; and sending first configuration information to the first UE according to the first request, where the first configuration information is used to configure the first target Gap.

According to a third aspect, an embodiment of the present disclosure provides user equipment UE. The UE is first UE and includes: a receiving module, configured to receive first enabling information from a network device, where the first enabling information is used to indicate whether a first need configuration of a first Gap is enabled, the first Gap is a Gap including at least one of N Gap types, and N is a positive integer; and a sending module, configured to send first request information to the network device in a case that the first enabling information received by the receiving module indicates that the first need configuration is enabled, where the first request information is used to request a first target Gap, and a Gap type of the first target Gap is at least one of the N Gap types, where the receiving module is further configured to receive first configuration information from the network device, where the first configuration information is used to configure the first target Gap.

According to a fourth aspect, an embodiment of the present disclosure provides a network device, including: a sending module, configured to send first enabling information to first user equipment UE, where the first enabling information is used to indicate whether a first need configuration of a first Gap is enabled, the first Gap is a Gap including at least one of N Gap types, and N is a positive integer; and a receiving module, configured to receive first request information from the first UE in a case that the first enabling information sent by the sending module indicates that the first need configuration is enabled, where the first request information is used to request a first target Gap, and a Gap type of the first target Gap is at least one of the N Gap types, where the sending module is further configured to send first configuration information to the first UE according to the first request information received by the receiving module, where the first configuration information is used to configure the first target Gap.

According to a fifth aspect, an embodiment of the present disclosure provides user equipment UE, including a processor, a memory, and a computer program that is stored in the memory and that can be run on the processor, where when the computer program is executed by the processor, the steps of the Gap configuration method in the first aspect are implemented.

According to a sixth aspect, an embodiment of the present disclosure provides a network device, including a processor, a memory, and a computer program that is stored in the memory and that can be run on the processor, where when the computer program is executed by the processor, the steps of the Gap configuration method in the second aspect are implemented.

According to a seventh aspect, an embodiment of the present disclosure provides a computer-readable storage medium, where the computer-readable storage medium

DETAILED DESCRIPTION

Figure 1:
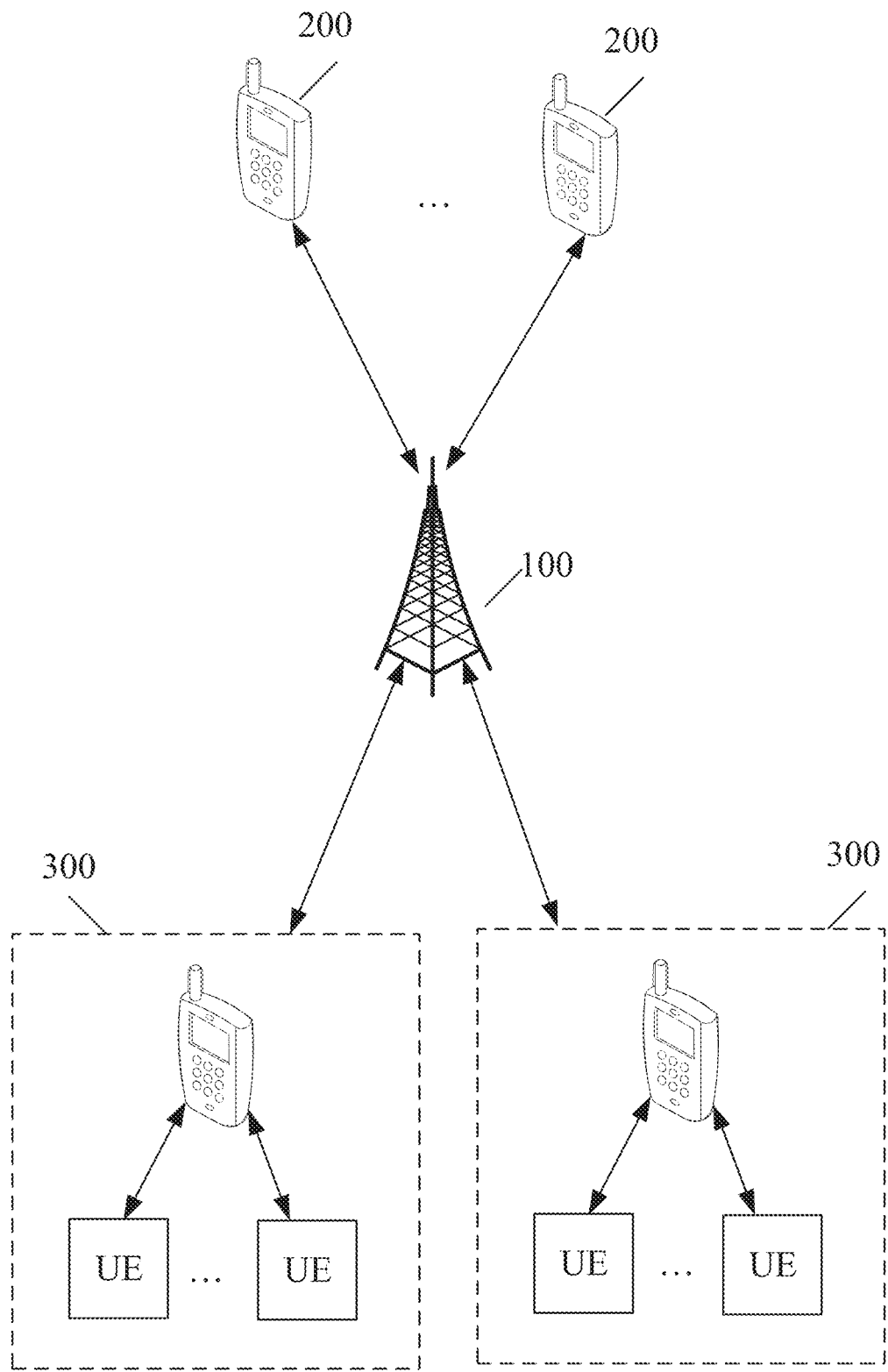
FIG. 1 is a first schematic structural diagram of a communications system according to an embodiment of the present disclosure.

The following describes the technical solutions in the embodiments of the present disclosure. Apparently, the described embodiments are some rather than all of the embodiments of the present disclosure.

It should be noted that, the character "/" in this specification represents the meaning of "or", for example, A/B may represent A or B; and the term "and/or" in this specification describes only an association relationship for describing associated objects and represents that three relationships may exist. For example, A and/or B may represent the following three cases: Only A exists, both A and B exist, and only B exists.

It should be noted that, to describe the technical solutions of the embodiments of this application, in the embodiments of this application, the terms "first", "second", and the like are used to distinguish same items or similar items whose functions or actions are basically the same, and a person skilled in the art may understand that the terms "first" "second", and the like do not limit a quantity and an execution order. For example, first request information and second request information are used to distinguish between different request information, and are not used to describe a specific sequence of the request information.

It should be noted that, in the embodiments of the present disclosure, the word "example" or "for example" is used to represent giving an example, an illustration, or a description. Any embodiment or design scheme described as an "example" in the embodiments of the present disclosure should not be explained as being more preferred or having more advantages than another embodiment or design scheme. Exactly, use of the term "example" or "for example" is intended to present a concept in a specific manner.

It should be noted that in the embodiments this application, "of (of)", "corresponding (corresponding, relevant)", and "corresponding (corresponding)" may be interchangeably used sometimes. It should be noted that, consistent meanings are expressed when differences are not emphasized. "A plurality of" in the embodiments of this application means two or more.

Some terms in this application document are described in the following:

1. Multi-SIM Terminal

A dual-SIM terminal and a multi-SIM terminal are collectively referred to as a multi-SIM terminal. The multi-SIM terminal is a terminal device that includes two or more Subscriber Identity Module (SIM). One SIM in the multi-SIM terminal may be used as one User Equipment (UE).

A capability of the multi-SIM terminal may be single sending and single receiving, single sending and dual receiving, dual sending and dual receiving, and the like.

The multi-SIM terminal may camp on a plurality of networks at the same time. However, different multi-SIM terminals simultaneously camp on a plurality of networks in different implementations.

Some terminal devices may simultaneously implement data sending and data receiving in a plurality of networks, and data sending and data receiving do not affect each other.

In addition, although some terminal devices may camp on a plurality of networks at the same time, the terminal device may camp on two networks in a Time Division Multiplexing Pattern (TDM Pattern). The terminal device may camp on a network A and monitor paging of the network A in a period of time, and camp on a network B and monitor paging of the network B in another period of time. In some embodiments, the terminal device may set up a connection with a network device and send/receive data in a network A in a period of time, and receive paging in a network B in another period of time. In some embodiments, the terminal device may receive data in a network A in a period of time, and set up a connection with a network device or send/receive data in a network B in another period of time.

It should be noted that the terminal device may interact with different networks by using different UEs (that is, SIMs) controlled by the terminal device. For example, the terminal device may camp on the network A by using UE A controlled by the terminal device, and camp on the network B by using UE B controlled by the terminal device.

2. Execute an NR Measurement Task Through Measurement Gap Negotiation

A network (for example, a network device in the network) configures a measurement Gap for UE, so that the UE executes a New Radio (NR) measurement task.

The network sends a Gap need configuration (Need For Gap Configuration) to indicate whether the UE can report a measurement Gap need.

The UE needs to report the measurement Gap need (Need For Gap). In addition, the reported measurement Gap need includes whether a Gap is needed, a frequency band of the needed Gap, intra-frequency measurement of the needed Gap, inter-frequency measurement of the needed Gap, and Inter-RAT measurement of the needed Gap. The network allocates the measurement Gap, so that the UE executes a measurement task by using the allocated Gap.

However, a multi-SIM terminal has diversified tasks, which are in some embodiments embodied as diversified multi-SIM tasks in the multi-SIM terminal. Tasks of the multi-SIM terminal include tasks in an idle mode and tasks in a connected mode. The tasks in the idle mode include paging, measurement, cell search, Public Land Mobile Network (PLMN) search, and the like. The tasks in the connected mode include a signaling process, SMS sending and receiving, a data service, and the like. In addition, terminal devices with different capabilities have diversified Gap needs when executing different tasks, that is, the terminal devices have Gap needs other than the measurement Gap need, to execute tasks other than the measurement task.

In conclusion, for multi-SIM terminals, capabilities, tasks, and resource conflicts of the terminal devices are diversified. How a terminal device requests a Gap from a network, and how the network correspondingly allocates the Gap becomes a to-be-resolved problem. In other words, a Gap allocation mechanism needs to be improved to better cover Gap negotiation and configuration needs of a multi-SIM terminal, to resolve a problem of how to configure a Gap that supports a task other than a measurement task.

To resolve the foregoing problem, the embodiments of the present disclosure provide a Gap configuration method, UE, and a network device. A network device sends first enabling information to a first UE, to indicate whether a first need configuration of a first Gap is enabled, that is, indicate whether a need of a Gap including at least one of N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the network device may send first configuration information to the first UE, to configure the first target Gap for the first UE. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

It should be noted that the Gap configuration method, the UE, and the network device provided in the embodiments of the present disclosure may be applied to a scenario in which diversified Gap negotiation and configuration is performed between a single-SIM terminal or a multi-SIM terminal and a network device.

In the embodiments of the present disclosure, the UE may be a SIM installed in the terminal device, or may be a plurality of devices associated with the terminal device. For example, the terminal device and the plurality of UEs may be a plurality of devices in the same Internet of Things, and the terminal device may be used as a control device of the plurality of UEs.

In some embodiments, in the Gap configuration method provided in the embodiments of the present disclosure, an execution body on a UE side may be UE, a Central Processing Unit (CPU) of the UE, or a control module configured to perform the Gap configuration method in the UE.

Similarly, in the Gap configuration method provided in the embodiments of the present disclosure, an execution body on a network device side may be a network device, or a CPU of the network device, or a control module configured to perform the Gap configuration method in the network device.

The technical solutions in the embodiments of the present disclosure may be applied to various communications systems, for example, a 4G Long Term Evolution (LTE) communications system, a 5G communications system, a future evolved system, or a plurality of communications fusion systems. There may be a plurality of application scenarios, such as a Machine to Machine (M2M) scenario, a Device to Machine (D2M) scenario, a macro/micro communication scenario, an enhance Mobile BroadBand (eMBB) scenario, an ultra-Reliable & Low Latency Communication (uRLLC) scenario, and a Massive Machine Type Communication (mMTC) scenario. These scenarios include but are not limited to communication between terminal devices, communication between network devices, communication between a network device and a terminal device, and the like. For example, the embodiments of the present disclosure may be applied to communication between a network device in a 5G communications system and one or more UEs.

FIG. 1 is a possible schematic structural diagram of a communications system according to an embodiment of the present disclosure. As shown in FIG. 1, the communications system includes at least one network device 100 (only one network device is shown in FIG. 1), one or more UEs 200 connected to each network device 100, and one or more UEs 300 connected to each network device 100. Each UE 200 may be a single-SIM terminal, and each UE 300 is a multi-SIM terminal.

Figure 2:
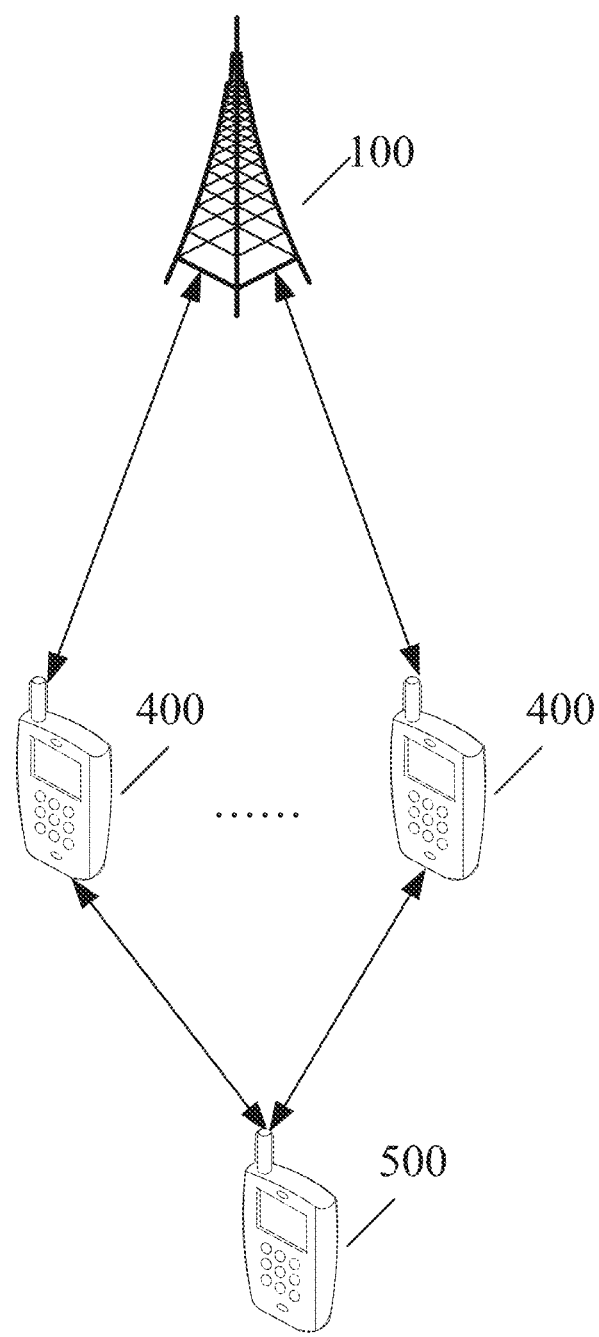
FIG. 2 is a second schematic structural diagram of a communications system according to an embodiment of the present disclosure.

In addition, FIG. 2 is another possible schematic structural diagram of a communications system according to an embodiment of the present disclosure. As shown in FIG. 2, the communications system includes at least one network device 100 (only one network device is shown in FIG. 2), one or more UEs 400 connected to each network device 100, and a terminal device 500 for connecting and controlling one or more UEs 400s.

The network device 100 may be a base station, a core network device, a Transmission and Reception Point (TRP), a relay station, an access point, or the like. The network device 100 may be a Base Transceiver Station (BTS) in a Global System for Mobile communication (GSM) or a Code Division Multiple Access (CDMA) network, or may be an NB (NodeB) in Wideband Code Division Multiple Access (WCDMA), or may be an eNB or an evolved NodeB (eNodeB) in LTE. In some embodiments, the network device 100 may be a radio controller in a Cloud Radio Access Network (CRAN) scenario. In some embodiments, the network device 100 may be a network device in a 5G communications system or a network device in a future evolved network. However, use of the words does not constitute a limitation on the present disclosure.

The UE 200, the UE 300, the UE 400, and the terminal devices may be wireless terminal devices or may be wired terminal devices. The wireless terminal device may be a device that provides voice and/or other service data connectivity for a user, a handheld device with a wireless communication function, a computing device, another processing device connected to a wireless modem, an in-vehicle device, a wearable device, a terminal device in a future 5G network, or a terminal device in a future evolved PLMN network. The wireless terminal device may communicate with one or more core networks by using a Radio Access Network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, built-in or vehicle-mounted mobile apparatus. The wireless terminal device may exchange voice and/or data with a radio access network, and may be a device such as a Personal Communication Service (PCS) phone, a cordless phone, a Session Initiation Protocol (SIP) phone, a Wireless Local Loop (WLL) station, or a Personal Digital Assistant (PDA). The wireless terminal device may be a mobile device, User Equipment (UE), a UE terminal device, an access terminal device, a wireless communication device, a terminal device unite, a terminal device station, a mobile station, a mobile console, a remote station, a distant station, a remote terminal device, a subscriber unit, a subscriber station, a user agent, a terminal device apparatus, or the like. For example, in the embodiments of this application, the UE 200, the UE 300, the UE 400, and the terminal device are mobile phones FIG. 1 and FIG. 2.

Embodiment 1

Figure 3:
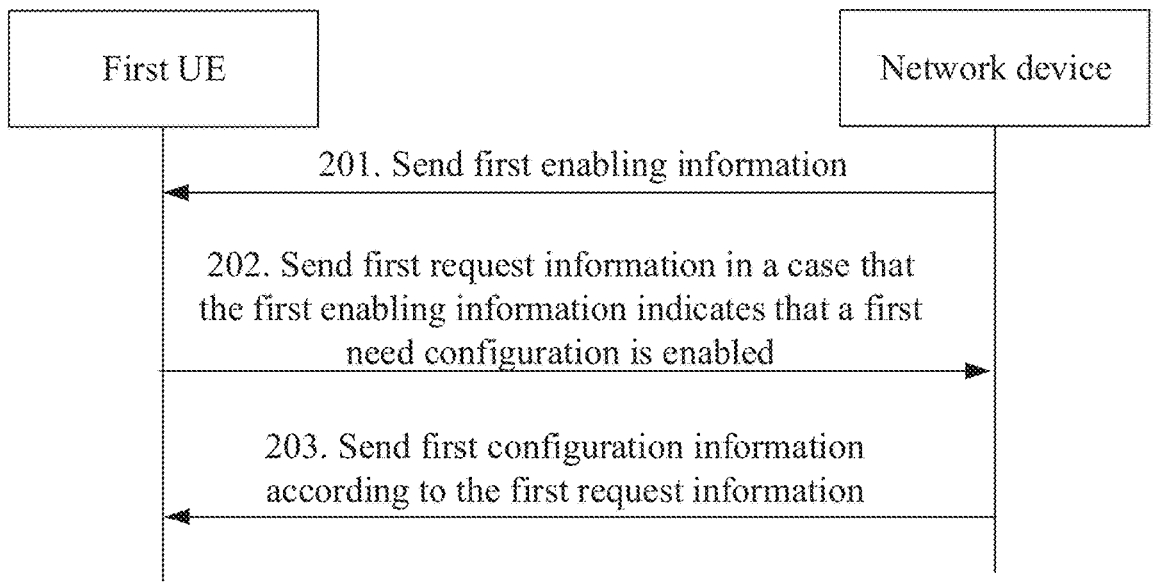
FIG. 3 is a first schematic flowchart of a Gap configuration method according to an embodiment of the present disclosure.

FIG. 3 is a schematic flowchart of a Gap configuration method according to an embodiment of the present disclosure. An example in which first UE interacts with a network device to perform the Gap configuration method is used for description. As shown in FIG. 3, the Gap configuration method may include the following steps.

Step 201: A network device sends first enabling information to first UE.

Correspondingly, the first UE may receive the first enabling information from the network device.

The first enabling information is used to indicate whether a first need configuration of a first Gap is enabled, the first Gap is a Gap including at least one of N Gap types, and N is a positive integer.

It can be understood that the first enabling information may be Need For Gap Configuration for the first Gap.

In some embodiments, the first UE is one UE in a single-SIM terminal or a multi-SIM terminal.

In some embodiments, the first Gap includes at least one of the following: a Gap for a terminal device; a Gap for the first UE; a Gap for second UE; a first time Gap corresponding to data receiving and sending; a capability-based Gap; a configuration-based Gap; a Multiple-Input Multiple-Output (MIMO) Gap; a Carrier aggregation (CA) Gap; a second time Gap corresponding to Uplink (UL) data sending; a third time Gap corresponding to Downlink (DL) data sending; a Gap corresponding to a Master Cell Group (MCG) of the first UE; and a Gap corresponding to a Secondary Cell group (SCG) of the first UE, where the second UE and the first UE are UE controlled by a same terminal device.

In some embodiments, in a case that the second UE and the first UE are controlled by a same terminal device, the first UE and the second UE may be different SIMs in the terminal device, or the first UE and the second UE may be two independent devices (for example, mobile phones) that are simultaneously controlled by the terminal device.

It should be noted that, in this embodiment of the present disclosure, Gap types may be classified in the following two manners: a manner 1 and a manner 2.

Manner 1: Gap types are classified according to devices corresponding to Gaps.

The Gap types classified in the manner 1 may include: a Gap for UE, a terminal Gap (Device Gap), a Gap for another UE (Other Gap), and a multi-SIM Gap.

The Gap for the UE may be the Gap for the first UE, the device Gap may be the Gap for the terminal device, the Gap for the another UE is the Gap for the second UE, and the multi-SIM Gap is implemented by the Gap for the first UE and the Gap for the second UE.

It can be understood that Gap corresponding to MCG of the first UE and the Gap corresponding to the SCG of the first UE may be subdivision of the Gap for the first UE.

Manner 2: Gap types are classified according to tasks corresponding to Gaps.

The Gap types classified in the manner 2 may include: a first time Gap corresponding to data receiving and sending; a capability-based Gap; a configuration-based Gap; a MIMO Gap; a CA Gap; a second time Gap; and a third time Gap.

In some embodiments, the Gap corresponding to the MCG includes at least one of the following: the first time Gap, the capability-based Gap, the configuration-based Gap, the MIMO Gap, the CA Gap, the second time Gap, and the third time Gap; and the Gap corresponding to the SCG includes at least one of the following: the first time Gap, the capability-based Gap, the configuration-based Gap, the MIMO Gap, the CA Gap, the second time Gap, and the third time Gap.

In some embodiments, one of the N Gap types corresponds to at least one task, and all or a part of the at least one task is different from a measurement task. That is, a Gap of one of the N Gap types may correspond to a task that is different from a measurement task. It indicates that the first Gap that is allocated to the UE by the network device can not only correspond to a measurement task, but also correspond to a task that is different from the measurement task. Apparently, the first Gap provided in this embodiment of the present disclosure is different from a conventional measurement Gap of a current corresponding measurement task.

In some embodiments, a task (denoted as a task 1) corresponding to the Gap for the terminal device includes: executing, inside the Gap, tasks of a plurality of UEs controlled by the terminal device.

Tasks of the terminal device may include a multi-UE task and another task. The multi-UE task may be a task of the first UE and a task of the second UE. The another task may be a task of the second UE.

For example, the tasks of the plurality of UEs controlled by the terminal device are states of the plurality of UEs in the terminal device and a task process that is being executed. UE states include an idle state, an inactive state, a connected state, and the like. UE tasks include tasks in an idle mode and tasks in a connected mode. The tasks in the idle mode may be paging, measurement, cell search, PLMN search, or the like. The tasks in the connected mode may be a signaling process, SMS sending and receiving, a data service, or the like.

In some embodiments, a task (denoted as a task 2) corresponding to the Gap for the first UE includes: executing a task of the first UE inside the Gap, for example, a task of sending and receiving data in a network A by the first UE.

In some embodiments, a task (denoted as a task 3) corresponding to the Gap for the second UE includes: executing a task of the second UE inside the Gap.

In some embodiments, a task corresponding to the first time Gap includes: stopping service data receiving and sending inside the Gap. Therefore, resources originally used for service data receiving and sending may be released inside the Gap, to support task scheduling of the terminal device or the first UE.

In some embodiments, a task (denoted as a task 4) corresponding to the capability-based Gap includes: using a first capability outside the Gap, and using a second capability inside the Gap, where the first capability is greater than the second capability. Therefore, resources occupied by capabilities used by the first UE may be reduced inside the Gap, to support task scheduling of the terminal device or the first UE.

In some embodiments, a task (denoted as a task 5) corresponding to the configuration-based Gap includes: using a first configuration outside the Gap, and using a second configuration inside the Gap, where the first configuration is greater than the second configuration. Therefore, resources occupied by configurations used by the first UE may be reduced inside the Gap, to support task scheduling of the terminal device or the first UE.

In some embodiments, a task (denoted as a task 6) corresponding to the MIMO Gap includes: reducing a quantity of MIMO layers inside the Gap. For example, the quantity of MIMO layers is reduced from 8 to 4 inside the Gap. Therefore, resources occupied by MIMO may be reduced inside the Gap, to support task scheduling of the terminal device or the first UE.

In some embodiments, a task (denoted as a task 7) corresponding to the CA Gap includes: reducing a CA quantity inside the Gap. Therefore, resources occupied by a CA process may be reduced inside the Gap, to support task scheduling of the terminal device or the first UE.

In some embodiments, a task (denoted as a task 8) corresponding to the second time Gap includes: stopping uplink data sending inside the Gap. Therefore, resources originally used for uplink data sending may be released inside the Gap, to support task scheduling of the terminal device or the first UE.

In some embodiments, a task (denoted as a task 9) corresponding to the third time Gap includes: stopping downlink data receiving inside the Gap. Therefore, resources originally used for downlink data receiving may be released inside the Gap, to support task scheduling of the terminal device or the first UE.

It should be noted that a task corresponding to the first Gap may be any combination of the foregoing tasks 1 to 8, that is, an "and/or" relationship between every two tasks in the tasks 1 to 8.

In some embodiments, the first enabling information and second enabling information are carried in a same Information Element (IE) in a same message, or the first enabling information and second enabling information are carried in different IEs in a same message, or the first enabling information and second enabling information are carried in different messages, where the second enabling information is received from the network device, the second enabling information is used to indicate whether a second need configuration of a second Gap is enabled, and the second Gap corresponds to a measurement task.

In some embodiments, the second Gap is only a Gap corresponding to a measurement task in the related art.

In some embodiments, the network device may send second enabling information to the first UE. Correspondingly, the first UE may receive the second enabling information from the network device.

For example, a message carrying the first enabling information and/or the second enabling information may be a Radio Resource Control Resume (RRC Resume) message, a Radio Resource Control Reconfiguration (RRC Reconfiguration) message, or the like.

In some embodiments, in a case that the first enabling information and second enabling information are separately carried in two messages, the network device may simultaneously or separately send the two messages to the first UE.

In some embodiments, if the first enabling information and the second enabling information are carried in different IEs, the first Gap and the second Gap are separately enabled. The first Gap and the second Gap may be separately enabled by using a same message or different messages.

In some embodiments, if the first enabling information and the second enabling information are carried in a same IE, the first Gap and the second Gap are separately enabled or the first Gap and the second Gap are simultaneously enabled. The first Gap and the second Gap may be simultaneously enabled by using a same message or different messages.

Step 202: The first UE sends first request information to the network device in a case that the first enabling information indicates that the first need configuration is enabled.

The first request information is used to request a first target Gap, and a Gap type of the first target Gap is at least one of the N Gap types.

Correspondingly, the network device may receive the first request information from the first UE.

For example, the Gap type of the first target Gap is the Gap for the second UE, that is, the Gap for the another UE.

In some embodiments, the first request information is carried in a target message, where the target message is any one of the following: a Radio Resource Control Resume Complete (RRC Resume Complete) message, a Radio Resource Reconfiguration Complete (RRC Reconfiguration Complete) message, and a User Equipment Assistance Information (UE Assistance Information) message.

In some embodiments, in a case that the first request information and the second request information are carried in a same message, the message may be RRC Resume Complete, RRC Reconfiguration Complete, or the like.

In a case that the first request information and the second request information are carried in different messages, the first request information may be UE Assistance Information, another message that supports a Gap request, or the like.

In some embodiments, in a case that the first configuration information and second configuration information are separately carried in two messages, the network device may simultaneously or separately send the two messages to the first UE.

In some embodiments, the first request information and third request information are carried in different IEs in a same message, or the first request information and third request information are carried in a same IE in a same message, or the first request information and third request information are carried in different messages, where the third request information is used to request a second Gap from the network device, and the second Gap corresponds to a measurement task.

In some embodiments, the first UE may send third request information to the network device. Correspondingly, the network device may receive the third request information from the first UE.

In some embodiments, in a case that the first request information and the third request information are separately carried in two messages, the first UE may simultaneously or separately send the two messages to the network device.

In some embodiments, the first request information includes at least one of the following: first indication information used to indicate whether the first UE needs a Gap, second indication information used to indicate a Gap type of a Gap requested by the first UE, third indication information used to indicate a task corresponding to the Gap requested by the first UE, and Gap time information of the Gap requested by the first UE.

It can be understood that the first indication information in the first request message indicates that the first UE needs a Gap, to be specific, the first UE needs the first target Gap. In some embodiments, the first indication information "Gap" indicates that the first UE needs a Gap, and the first indication information "No Gap" indicates that the first UE does not need a Gap. The second indication information indicates the Gap type of the first target Gap requested by the first UE. The third indication information indicates a task corresponding to the first target Gap, and a Gap request purpose (Gap Purpose).

In some embodiments, the Gap time information includes at least one of the following: a start moment of a Gap, Gap duration, and Gap cycle information.

The Gap cycle information is used to indicate that the requested Gap is a one-time Gap or a periodic Gap, a quantity of periodic Gap cycles, a time interval of different cycles, and the like.

In some embodiments, the task corresponding to the requested Gap (for example, the first target Gap) includes at least one of the following: a task of a terminal device, a task of the first UE, a task of second UE, an idle-state task, a signaling process, and another service. The second UE and the first UE are UE controlled by a same terminal device.

Step 203: The network device sends first configuration information to the first UE according to the first request information.

Correspondingly, the first UE may receive the first configuration information from the network device.

The first configuration information is used to configure the first target Gap.

In some embodiments, the first configuration information includes at least one of the following: Gap time information of the first Gap and resource configuration information. The resource configuration information is used to indicate a resource configuration of the first UE inside the first Gap, and the resource configuration information is determined based on the first request information.

For example, the resource configuration information is used to instruct the first UE to reduce a part or all of resource configurations in original configurations.

For example, when a Gap type of a Gap requested by the first request information is the Gap for the terminal device, the resource configuration information is used to instruct the first UE to reduce a part or all of resource configurations in the original configurations.

In some embodiments, the first configuration information and second configuration information are carried in different IEs in a same message, or the first configuration information and second configuration information are carried in a same IE in a same message, or the first configuration information and second configuration information are carried in different messages, where the second configuration information is received from the network device, and the second configuration information is used to configure a second Gap.

In some embodiments, the network device may send second configuration information to the first UE. Correspondingly, the first UE may receive the second configuration information from the network device.

For example, a message carrying the first configuration information and/or the second configuration information may be a RRC Resume message, a RRC Reconfiguration message, or the like.

Figure 4:
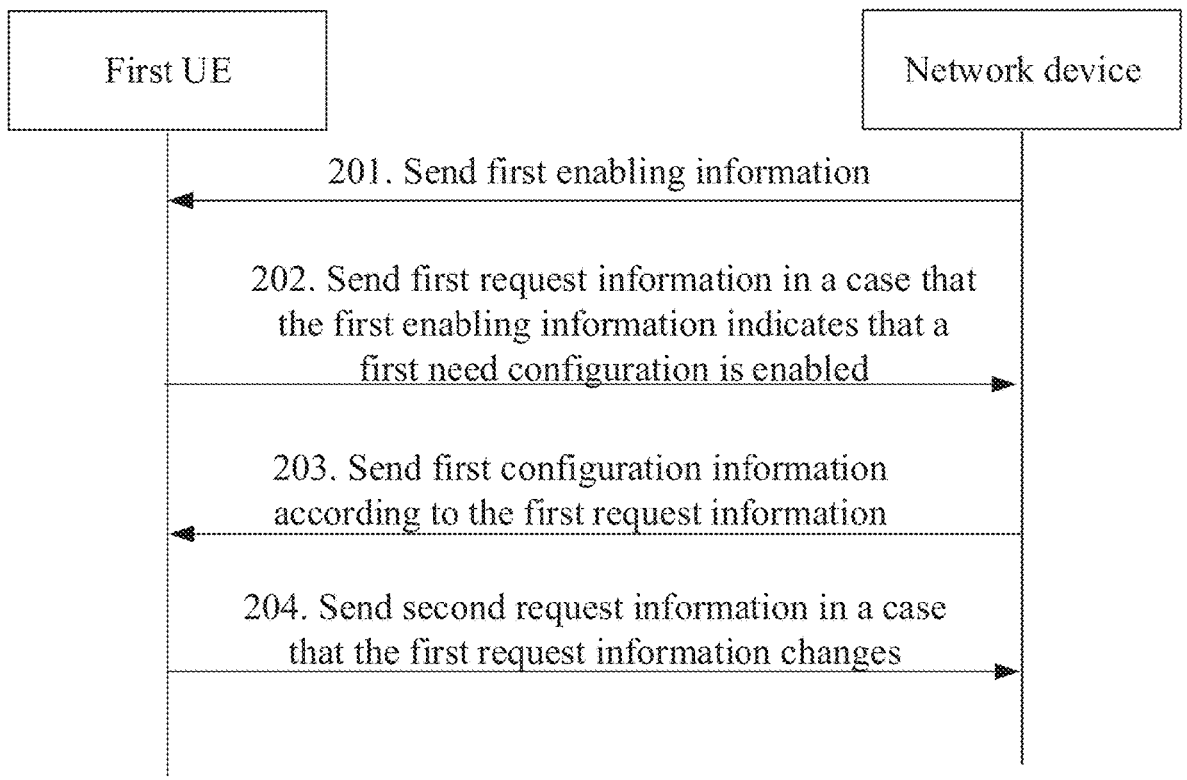
FIG. 4 is a second schematic flowchart of a Gap configuration method according to an embodiment of the present disclosure.

Further, in some embodiments, with reference to FIG. 3, as shown in FIG. 4, after step 203 the Gap method provided in this embodiment of the present disclosure further includes step 204.

Step 204: The first UE sends second request information to the network device in a case that the first request information changes.

The case that the first request information changes includes at least one of the following: a task corresponding to the first target Gap changes, a configuration of a second Gap changes, and a radio resource control RRC configuration changes.

For example, that the radio resource control RRC configuration changes is that an RRC Reconfiguration message changes.

In some embodiments, if the configuration of the second Gap changes so that the second Gap meets resource scheduling of a task in the first UE or a terminal device that controls the first UE, the first UE changes to not requiring the first Gap.

In some embodiments, the second request information is used to request a second target Gap, a Gap type of the second target Gap is at least one of the N Gap types, and the second Gap corresponds to a measurement task. That is, after requesting the first target Gap, the first UE requests the second target Gap of the Gap type in the N Gap types again.

It can be understood that the first target Gap is the same as or different from the second target Gap.

Correspondingly, the network device may receive a second request message from the first UE, where the second request information is a change of the first request information; and the second request information is used to request a second target Gap, and a Gap type of the second target Gap is at least one of the N Gap types.

It should be noted that, in this embodiment of the present disclosure, Gap request messages may be classified into a first-type Gap request message used to request diversified Gaps and a second-type Gap request message used to request a measurement Gap. Both a message in which the first request information is located and a message in which the second request information is located are first-type Gap request messages, and a message in which the third request information is located is a second-type Gap request message.

Figure 5:
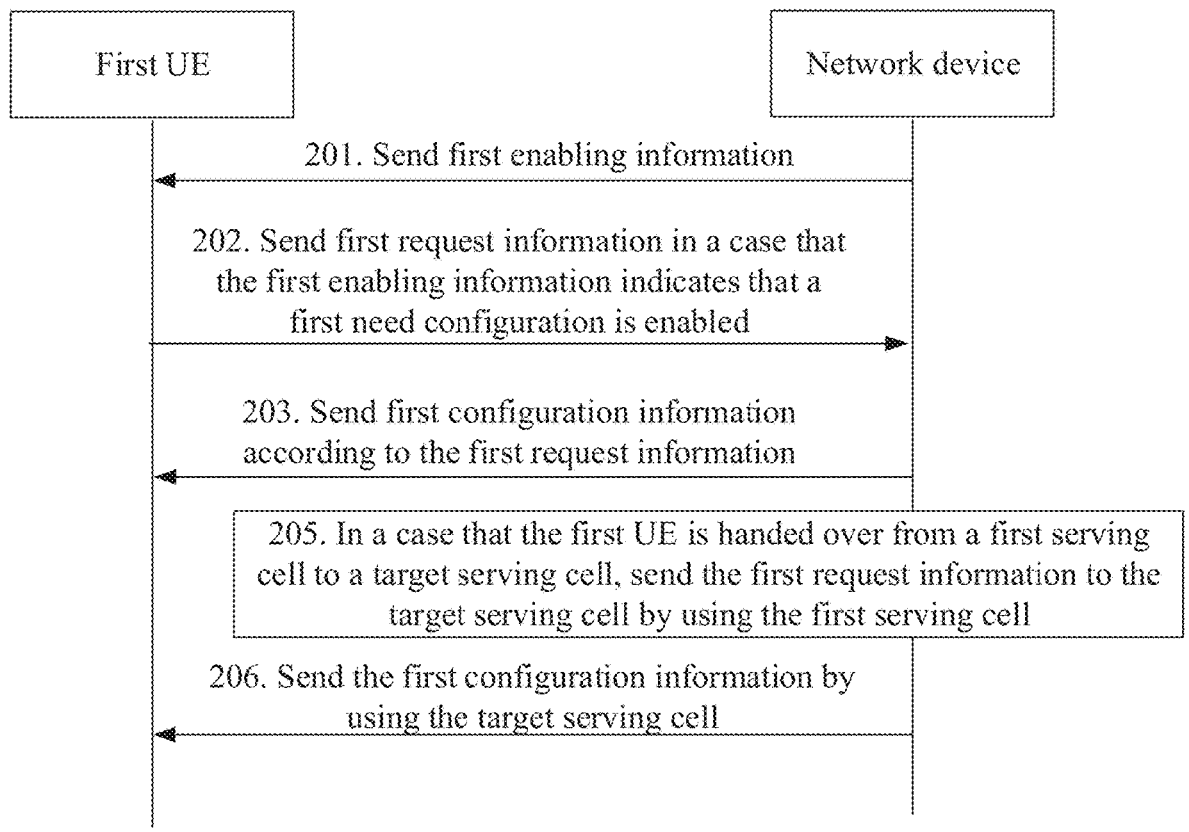
FIG. 5 is a third schematic flowchart of a Gap configuration method according to an embodiment of the present disclosure.

It can be understood that with reference to FIG. 3, as shown in FIG. 5, the Gap method provided in this embodiment of the present disclosure further includes step 205 and step 206. For example, after step 203, the method further includes step 205 and step 206.

Step 205: In a case that the first UE is handed over from a first serving cell to a target serving cell, the network device sends the first request information to the target serving cell by using the first serving cell.

For example, the network device sends the first request information to a base station in which the target serving cell is located by using a base station in which the first serving cell is located.

Step 206: The network device sends the first configuration information to the first UE by using the target serving cell.

In this way, in a case that the first UE is handed over from the first serving cell to the target serving cell, the network device sends the first request information to the target serving cell by using the first serving cell, so that the target serving cell can quickly and conveniently learn the first request information of the first UE, and the first UE does not need to in some embodiments exchange the first request information with the target serving cell.

In some embodiments, the Gap method provided in this embodiment of the present disclosure may further include step 207. For example, after step 203, the method further includes step 207.

Step 207: The network device sends third enabling information to the first UE.

Correspondingly, the first UE may receive the third enabling information from the network device.

The third enabling information is used to indicate at least one of the following: whether the first need configuration is enabled, and whether a second need configuration of a second Gap is enabled; and the second Gap corresponds to a measurement task.

It can be understood that the network device may trigger, at any time, enabling information for changing a Gap need for the first UE. For example, in the case of a shortage of resources of the network device, the Gap need for the first UE is disabled.

In some embodiments, after step 203, the Gap configuration method (in some embodiments, a first Gap negotiation process) provided in this embodiment of the present disclosure further includes the following scenarios 1 to 5:

Scenario 1: A network sets up or releases a second Gap configuration for a plurality of times. For example, the network device may initiate enabling information (for example, third enabling information) for a plurality of times.

Scenario 2: The UE changes a first Gap request. The UE may change content of a Gap request, including that a second Gap is not needed.

Scenario 3: Repeat a negotiation process, including a plurality of times of repetition of the foregoing steps 201 to 203.

Scenario 4: The UE in the connected mode may jointly negotiate a first Gap and a second Gap, or independently negotiate a first Gap and a second Gap.

The jointly negotiating the first Gap and the second Gap may include: simultaneously sending information related to the first Gap (for example, enabling information) and information related to the second Gap (for example, enabling information), and carrying the information related to the first Gap and the information related to the second Gap by using a same message or a same information element.

Scenario 5: When the second Gap meets needs of tasks of a plurality of UEs controlled by the terminal device, the UE does not need to initiate the first Gap negotiation.

In this embodiment of the present disclosure, the Gap configuration method is described below by using examples 1 to 3.

Example 1

Figure 6:
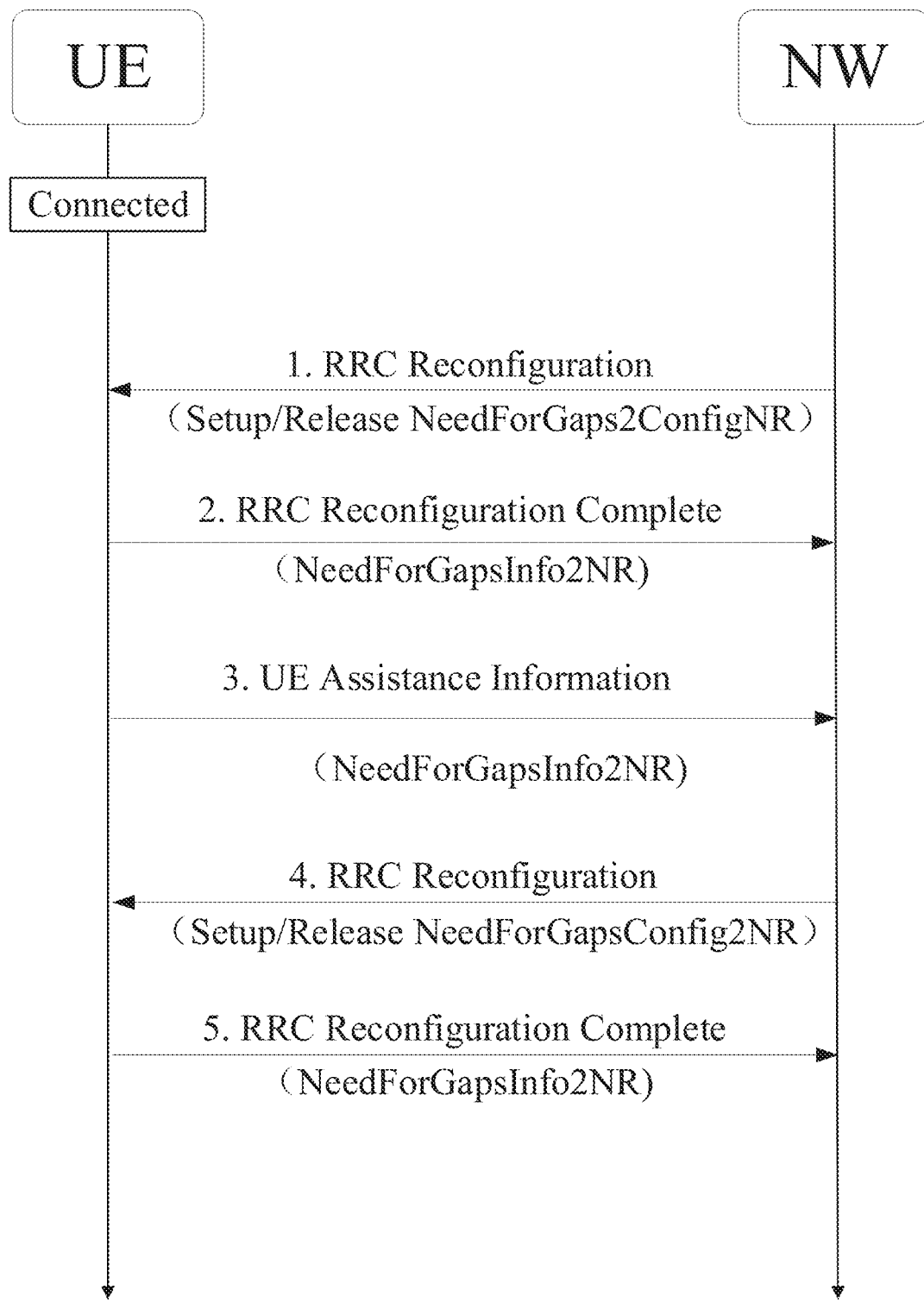
FIG. 6 is a fourth schematic flowchart of a Gap configuration method according to an embodiment of the present disclosure.

First Gap negotiation in a connected state is described. As shown in FIG. 6, FIG. 6 is a schematic flowchart of a Gap configuration method according to an embodiment of the present disclosure.

Step 1: UE (for example, first UE) is in a connected state, and receives a downlink message RRC Reconfiguration from a network (denoted as an NW, for example, a network device).

The RRC Reconfiguration message indicates setup or release of a first Gap configuration (Setup/Release NeedForGaps2ConfigNR).

Setup of the first Gap configuration means that a first need configuration of the first Gap is changed from not enabling to enabling, and releasing of the first Gap configuration means that the first need configuration of the first Gap is changed from enabling to not enabling.

In some embodiments, the first Gap negotiation may be configured as independent IE NeedForGapsConfigNR.

In some embodiments, the first Gap and the second Gap are configured in same IE NeedForGapsConfigNR to be separately enabled.

In some embodiments, the first Gap and the second Gap are configured in same IE NeedForGapsConfigNR to be simultaneously enabled, that is, being simultaneously set up or released.

The first Gap is a Gap (that is, diversified Gap) including at least one of N Gap types, and the second Gap is a measurement Gap corresponding to a measurement task.

Step 2: The UE sends RRC Reconfiguration Complete.

If the network sets up the first Gap negotiation, the RRC Reconfiguration Complete includes a first Gap request message. The first Gap request message includes Gap information of task needs (for example, NeedForGapsIofo2NR) of a plurality of UEs (for example, the plurality of UEs including the first UE) controlled by a terminal device.

In some embodiments, the first Gap request message may be the foregoing target message that carries the first request information.

Step 3: The UE sends a UE Assistance Information message when tasks of a plurality of UEs controlled by the terminal device changes.

The UE sends the UE Assistance Information message to initiate the first Gap negotiation (for example, NeedForGapsIofo2NR).

In some embodiments, the change in the tasks of the plurality of UEs controlled by the terminal device includes but is not limited to:

a) Another UE of a multi-SIM terminal performs cell reselection, which causes a paging location change, and the UE applies for a periodic Gap.

b) Another UE of a multi-SIM terminal performs a mobility update, such as a TAU/registration request, and the UE applies for a one-time Gap.

Step 4: The UE receives a downlink message RRC Reconfiguration from the network.

The RRC Reconfiguration message includes first Gap configuration information used for Setup/Release NeedForGaps2ConfigNR.

In some embodiments, in a UE handover process, an original serving cell transmits the first Gap configuration to a handed-over target serving cell. For example, the first Gap request message in step 2 is transmitted to the target serving cell by using the original serving cell, so that the RRC Reconfiguration message sent by the target serving cell to the UE includes the first Gap configuration information.

Step 5: The UE sends an RRC Reconfiguration Complete message.

The UE may include the first Gap request message, to negotiate the first Gap (for example, NeedForGapsIofo2NR) again.

The foregoing step 4 and step 5 may be repeatedly performed.

In some embodiments, after step 5 in the example 1, step 6 may be further included.

Step 6: The UE receives a downlink message RRC Reconfiguration.

The RRC Reconfiguration message includes the first Gap configuration information, and the network device may release or set up the first Gap negotiation at any time.

Example 2

Figure 7:
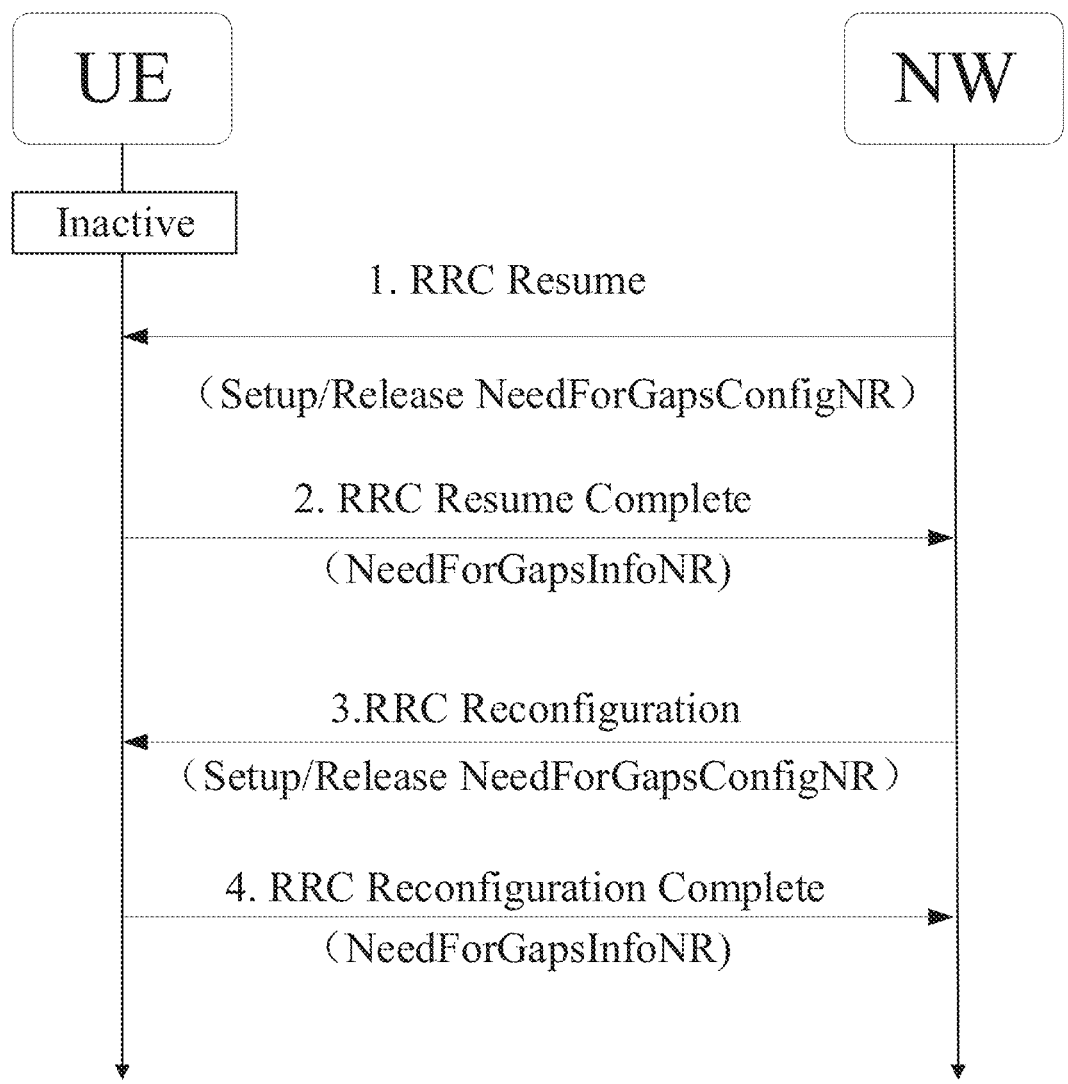
FIG. 7 is a fifth schematic flowchart of a Gap configuration method according to an embodiment of the present disclosure.

First Gap negotiation when UE enters a connected state from an RRC inactive state is described. As shown in FIG. 7, FIG. 7 is a schematic flowchart of a Gap configuration method according to an embodiment of the present disclosure.

Step 1: UE (for example, first UE) is in an inactive (that is, inactive) state, and receives a downlink message RRC Resume from a network (that is, an NW).

The RRC Resume message indicates setup or release of the first Gap negotiation (Setup/Release NeedForGaps2ConfigNR).

In some embodiments, second Gap negotiation may be configured as independent IE NeedForGapsConfigNR.

In some embodiments, the second Gap and the first Gap are configured in same IE NeedForGapsConfigNR to be separately enabled.

In some embodiments, the second Gap and the first Gap are configured in same IE NeedForGapsConfigNR to be simultaneously enabled, that is, being simultaneously set up or released.

Step 2: If the network sets up the first Gap negotiation, the UE sends RRC Resume Complete.

The RRC Resume Complete includes a first Gap request message, and the first Gap request message includes Gap information of task needs of a plurality of UEs controlled by a terminal device. In some embodiments, the first Gap request message may be the foregoing target message that carries the first request information.

Step 3: The UE receives a downlink message RRC Reconfiguration from the network.

The RRC Reconfiguration message includes first Gap configuration information.

Step 4: The UE sends an RRC Reconfiguration Complete message.

The UE may include the first Gap request message, to negotiate the first Gap.

The foregoing step 3 and step 4 may be repeatedly performed.

Step 5: The UE receives a downlink message RRC Reconfiguration from the network.

The RRC Reconfiguration message includes the first Gap configuration information, and the first Gap negotiation may be released or set up at any time.

Example 3

Figure 8:
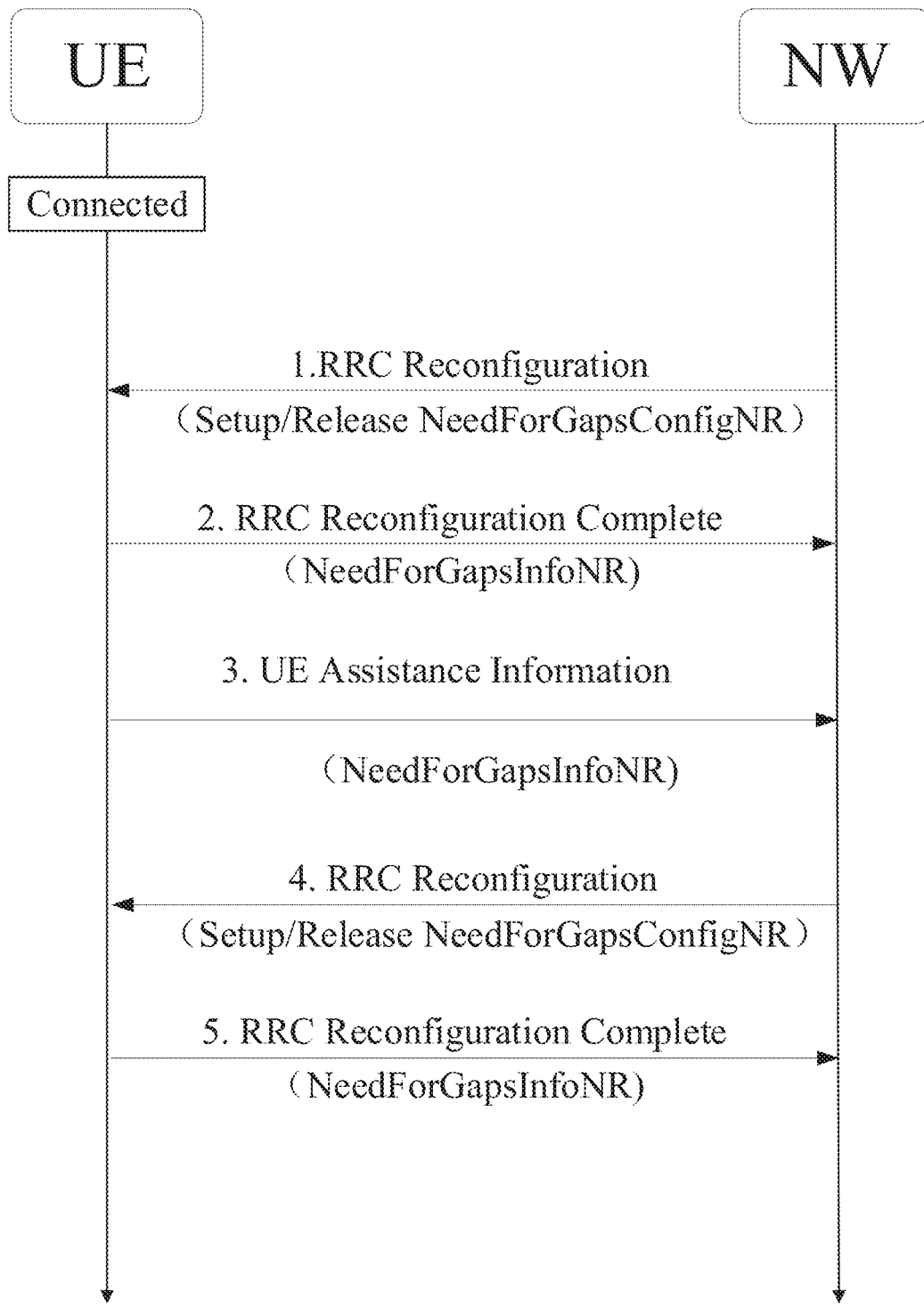
FIG. 8 is a sixth schematic flowchart of a Gap configuration method according to an embodiment of the present disclosure.

UE and a network (for example, a network device) jointly negotiate a first Gap and a second Gap. As shown in FIG. 8, FIG. 8 is a schematic flowchart of a Gap configuration method according to an embodiment of the present disclosure.

Step 1: UE is in a connected state and receives a downlink message RRC Reconfiguration from a network.

The RRC Reconfiguration message indicates setup or release of first Gap negotiation (Setup/Release NeedForGapsConfigNR).

In some embodiments, the second Gap and the first Gap are configured in same IE NeedForGapsConfigNR to be separately enabled.

In some embodiments, the second Gap and the first Gap are configured in same IE NeedForGapsConfigNR to be simultaneously enabled, that is, being simultaneously set up or released.

In some embodiments, the first Gap negotiation may be configured as independent IE NeedForGaps2ConfigNR.

Step 2: The UE sends RRC Reconfiguration Complete.

If the network sets up the first Gap negotiation and/or second Gap negotiation, the RRC Reconfiguration Complete includes a first Gap and/or second Gap request message.

Step 3: The UE initiates the first Gap negotiation and sends a UE Assistance Information message when tasks of a plurality of UEs controlled by a terminal device changes.

Step 4: The UE receives a downlink message RRC Reconfiguration from the network.

The RRC Reconfiguration message includes first Gap and/or second Gap configuration information.

Step 5: The UE sends an RRC Reconfiguration Complete message.

The UE may include the first Gap and/or second Gap request message, to perform Gap negotiation again.

The foregoing step 4 and step 5 may be repeatedly performed.

Step 6: The UE receives a downlink message RRC Reconfiguration from the network.

The RRC Reconfiguration message includes the first Gap and/or second Gap configuration information, and the first Gap and/or second Gap negotiation may be released or set up at any time.

Example 4

UE initiates first Gap request messages (that is, the foregoing target message) for requesting a plurality of Gap types, including but is not limited to:
- a first Gap request message for requesting a MIMO Gap: the UE requests to reduce a quantity of MIMO layers in a specific time period, for example, from 8 MIMO to 4 MIMO, where the specific time period may be a periodic Gap or a one-time Gap; and an RRC Configuration message is configured to reduce the quantity of MIMO layers inside the Gap;
- a first Gap request message for requesting a CA Gap: the UE requests to reduce a CA quantity in a specific time period, for example, from 6 CA to 5 CA, where the specific time period may be a periodic Gap or a one-time Gap; and an RRC Configuration message is configured to reduce the CA quantity at a Gap moment;
- a first Gap request message for requesting a second time Gap (that is, Tx Gap) corresponding to UL data sending: the UE requests to stop transmission at a specific time period, where the specific time period may be a periodic Gap or a one-time Gap; and an RRC Configuration message is configured to stop UE transmission inside the Gap, and data receiving of the UE is normally performed;
- a first Gap request message for requesting a third time Gap (that is, Rx Gap) corresponding to DL data receiving: the UE requests to stop receiving at a specific time period, where the specific time period may be a periodic Gap or a one-time Gap; and an RRC Configuration message is configured to stop the UE from receiving data inside the Gap; and a first Gap request message for requesting a Gap corresponding to an MCG and/or SCG: UE requests to generate a Gap in a specific time period on the MCG, where for example, a configuration 1 is used outside the Gap, and a configuration 2 is used inside the Gap; the specific time period may be a periodic Gap or a one-time Gap; the configuration 1 is an original configuration; the configuration 2 is partially reducing the configuration 1 or completely stopping the configuration 1; and an RRC Configuration message configures a Gap on the MCG and/or SCG.

In this embodiment of the present disclosure, a network device sends first enabling information to first UE, to indicate whether a first need configuration of a first Gap is enabled, that is, indicate whether a need of a Gap including at least one of N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the network device may send first configuration information to the first UE, to configure the first target Gap for the first UE. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

Figure 9:
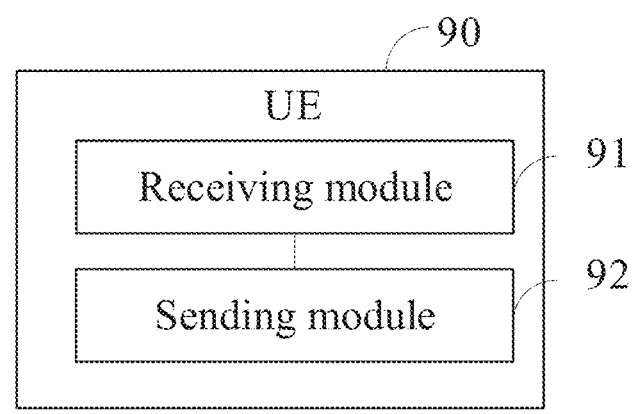
FIG. 9 is a first schematic structural diagram of UE according to an embodiment of the present disclosure.

FIG. 9 is a schematic structural diagram of UE according to an embodiment of the present disclosure. As shown in FIG. 9, UE 90 is a first UE and includes: a receiving module 91, configured to receive first enabling information from a network device, where the first enabling information is used to indicate whether a first need configuration of a first Gap is enabled, and the first Gap is a Gap including N Gap types; and a sending module 92, configured to send first request information to the network device in a case that the first enabling information received by the receiving module 91 indicates that the first need configuration is enabled, where the first request information is used to request a first target Gap, and a Gap type of the first target Gap is at least one of the N Gap types, where the receiving module 91 is further configured to receive first configuration information from the network device, where the first configuration information is used to configure the first target Gap.

In some embodiments, the first Gap includes at least one of the following: a Gap for a terminal device; a Gap for the first UE; a Gap for second UE; a first time Gap corresponding to data receiving and sending; a capability-based Gap; a configuration-based Gap; a MIMO Gap; a CA Gap; a second time Gap corresponding to uplink data sending; a third time Gap corresponding to downlink data sending; a Gap corresponding to a master cell group MCG of the first UE; and a Gap corresponding to a Secondary Cell Group (SCG) of the first UE, where the second UE and the first UE are UE controlled by a same terminal device.

In some embodiments, the Gap corresponding to the MCG includes at least one of the following: the first time Gap, the capability-based Gap, the configuration-based Gap, the MIMO Gap, the CA Gap, the second time Gap, and the third time Gap; and the Gap corresponding to the SCG includes at least one of the following: the first time Gap, the capability-based Gap, the configuration-based Gap, the MIMO Gap, the CA Gap, the second time Gap, and the third time Gap.

In some embodiments, one of the N Gap types corresponds to at least one task, and all or a part of the at least one task is different from a measurement task.

In some embodiments, a task corresponding to the Gap for the terminal device includes: executing, inside the Gap, tasks of a plurality of UEs controlled by the terminal device; and/or a task corresponding to the Gap for the first UE includes: executing a task of the first UE inside the Gap; and/or a task corresponding to the Gap for the second UE includes: executing a task of the second UE inside the Gap; and/or a task corresponding to the first time Gap includes: stopping service data receiving and sending inside the Gap; and/or a task corresponding to the capability-based Gap includes: using a first capability outside the Gap, and using a second capability inside the Gap, where the first capability is greater than the second capability; and/or a task corresponding to the configuration-based Gap includes: using a first configuration outside the Gap, and using a second configuration inside the Gap, where the first configuration is greater than the second configuration; and/or a task corresponding to the MIMO Gap includes: reducing a quantity of MIMO layers inside the Gap; and/or a task corresponding to the CA Gap includes: reducing a CA quantity inside the Gap; and/or a task corresponding to the second time Gap includes: stopping uplink data sending inside the Gap; and/or a task corresponding to the third time Gap includes: stopping downlink data receiving inside the Gap.

In some embodiments, the first enabling information and second enabling information are carried in a same information element IE in a same message, or the first enabling information and second enabling information are carried in different IEs in a same message, or the first enabling information and second enabling information are carried in different messages, where the second enabling information is received from the network device, the second enabling information is used to indicate whether a second need configuration of a second Gap is enabled, and the second Gap corresponds to a measurement task.

In some embodiments, if the first enabling information and the second enabling information are carried in different IEs, the first Gap and the second Gap are separately enabled; or if the first enabling information and the second enabling information are carried in a same IE, the first Gap and the second Gap are separately enabled or the first Gap and the second Gap are simultaneously enabled.

In some embodiments, the sending module 92 is further configured to: after sending the first request information to the network device, send second request information to the network device in a case that the first request information changes, where the case that the first request information changes includes at least one of the following: a task corresponding to the first target Gap changes, a configuration of a second Gap changes, and a radio resource control RRC configuration changes; and the second request information is used to request a second target Gap, a Gap type of the second target Gap is at least one of the N Gap types, and the second Gap corresponds to a measurement task.

In some embodiments, the first request information is carried in a target message, where the target message is any one of the following: a RRC Resume Complete message, a RRC Reconfiguration Complete message, and a UE Assistance Information message.

In some embodiments, the first request information includes at least one of the following: first indication information used to indicate whether the first UE needs a Gap, second indication information used to indicate a Gap type of a Gap requested by the first UE, third indication information used to indicate a task corresponding to the Gap requested by the first UE, and Gap time information of the Gap requested by the first UE.

In some embodiments, the Gap time information includes at least one of the following: a start moment of a Gap, Gap duration, and Gap cycle information.

In some embodiments, the task corresponding to the requested Gap includes at least one of the following: a task of a terminal device, a task of the first UE, a task of second UE, an idle-state task, a signaling process, and another service, where the second UE and the first UE are UE controlled by a same terminal device.

In some embodiments, the receiving module 91 is further configured to receive third enabling information from the network device after receiving the first enabling information from the network device, where the third enabling information is used to indicate at least one of the following: whether the first need configuration is enabled, and whether a second need configuration of a second Gap is enabled; and the second Gap corresponds to a measurement task.

In some embodiments, the first configuration information includes at least one of the following: Gap time information of the first Gap and resource configuration information, where the resource configuration information is used to indicate a resource configuration of the first UE inside the first Gap, and the resource configuration information is determined based on the first request information.

In some embodiments, the first request information and third request information are carried in different IEs in a same message, or the first request information and third request information are carried in a same IE in a same message, or the first request information and third request information are carried in different messages, where the third request information is used to request a second Gap from the network device, and the second Gap corresponds to a measurement task.

In some embodiments, the first configuration information and second configuration information are carried in different IEs in a same message, or the first configuration information and second configuration information are carried in a same IE in a same message, or the first configuration information and second configuration information are carried in different messages, where the second configuration information is received from the network device, and the second configuration information is used to configure a second Gap.

The UE 90 provided in this embodiment of the present disclosure can implement the processes of the foregoing method embodiment. To avoid repetition, details are not described herein again.

According to the UE provided in this embodiment of the present disclosure, the first UE may receive the first enabling information from the network device, to learn whether the first need configuration of the first Gap is enabled, that is, indicate whether a need of the Gap including the at least one of the N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the first UE receives the first configuration information from the network device, to configure the first target Gap. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

Figure 10:
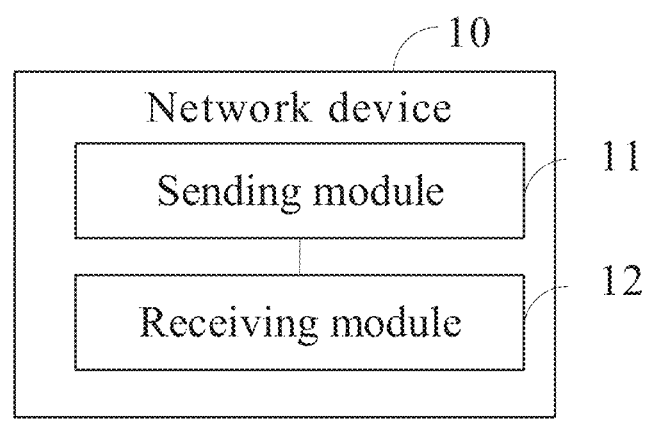
FIG. 10 is a first schematic structural diagram of a network device according to an embodiment of the present disclosure.

FIG. 10 is a schematic structural diagram of a network device according to an embodiment of the present disclosure. As shown in FIG. 10, a network device 10 includes: a sending module 11, configured to send first enabling information to first user equipment UE, where the first enabling information is used to indicate whether a first need configuration of a first Gap is enabled, and the first Gap is a Gap including at least one of N Gap types; and a receiving module 12, configured to receive first request information from the first UE in a case that the first enabling information sent by the sending module 11 indicates that the first need configuration is enabled, where the first request information is used to request a first target Gap, and a Gap type of the first target Gap is at least one of the N Gap types, where the sending module 11 is further configured to send first configuration information to the first UE according to the first request information received by the receiving module 12, where the first configuration information is used to configure the first target Gap.

In some embodiments, the first Gap includes at least one of the following: a Gap for a terminal device; a Gap for the first UE; a Gap for second UE; a first time Gap corresponding to data receiving and sending; a capability-based Gap; a configuration-based Gap; a MIMO Gap; a CA Gap; a second time Gap corresponding to uplink data sending; a third time Gap corresponding to downlink data sending; a Gap corresponding to a master cell group MCG of the first UE; and a Gap corresponding to a SCG of the first UE, where the second UE and the first UE are UE controlled by a same terminal device.

In some embodiments, the Gap corresponding to the MCG includes at least one of the following: the first time Gap, the capability-based Gap, the configuration-based Gap, the MIMO Gap, the CA Gap, the second time Gap, and the third time Gap; and the Gap corresponding to the SCG includes at least one of the following: the first time Gap, the capability-based Gap, the configuration-based Gap, the MIMO Gap, the CA Gap, the second time Gap, and the third time Gap.

In some embodiments, one of the N Gap types corresponds to at least one task, and all or a part of the at least one task is different from a measurement task.

In some embodiments, a task corresponding to the Gap for the terminal device includes: executing, inside the Gap, tasks of a plurality of UEs controlled by the terminal device; and/or a task corresponding to the Gap for the first UE includes: executing a task of the first UE inside the Gap; and/or a task corresponding to the Gap for the second UE includes: executing a task of the second UE inside the Gap; and/or a task corresponding to the first time Gap includes: stopping service data receiving and sending inside the Gap; and/or a task corresponding to the capability-based Gap includes: using a first capability outside the Gap, and using a second capability inside the Gap, where the first capability is greater than the second capability; and/or a task corresponding to the configuration-based Gap includes: using a first configuration outside the Gap, and using a second configuration inside the Gap, where the first configuration is greater than the second configuration; and/or a task corresponding to the MIMO Gap includes: reducing a quantity of MIMO layers inside the Gap; and/or a task corresponding to the CA Gap includes: reducing a CA quantity inside the Gap; and/or a task corresponding to the second time Gap includes: stopping uplink data sending inside the Gap; and/or a task corresponding to the third time Gap includes: stopping downlink data receiving inside the Gap.

In some embodiments, the first enabling information and second enabling information are carried in a same information element IE in a same message, or the first enabling information and second enabling information are carried in different IEs in a same message, or the first enabling information and second enabling information are carried in different messages, where the second enabling information is received from the network device, the second enabling information is used to indicate whether a second need configuration of a second Gap is enabled, and the second Gap corresponds to a measurement task.

In some embodiments, if the first enabling information and the second enabling information are carried in different IEs, the first Gap and the second Gap are separately enabled; or if the first enabling information and the second enabling information are carried in a same IE, the first Gap and the second Gap are separately enabled or the first Gap and the second Gap are simultaneously enabled.

In some embodiments, the receiving module 12 is further configured to receive a second request message from the first UE, where the second request information is a change of the first request information; and the second request information is used to request a second target Gap, and a Gap type of the second target Gap is at least one of the N Gap types.

In some embodiments, the first request information is carried in a target message, where the target message is any one of the following: a RRC Resume Complete message, a RRC Reconfiguration Complete message, and a UE Assistance Information message.

In some embodiments, the first request information includes at least one of the following: first indication information used to indicate whether the first UE needs a Gap, second indication information used to indicate a Gap type of a Gap requested by the first UE, third indication information used to indicate a task corresponding to the Gap requested by the first UE, and Gap time information of the Gap requested by the first UE.

In some embodiments, the Gap time information includes at least one of the following: a start moment of a Gap, Gap duration, and Gap cycle information.

In some embodiments, the task corresponding to the requested Gap includes at least one of the following: a task of a terminal device, a task of the first UE, a task of second UE, an idle-state task, a signaling process, and another service, where the second UE and the first UE are UE controlled by a same terminal device.

In some embodiments, the sending module 11 is further configured to send third enabling information to the first UE after sending the first enabling information to the first UE, where the third enabling information is used to indicate at least one of the following: whether the first need configuration is enabled, and whether a second need configuration of a second Gap is enabled; and the second Gap corresponds to a measurement task.

In some embodiments, the first configuration information includes at least one of the following: Gap time information of the first Gap and resource configuration information, where the resource configuration information is used to indicate a resource configuration of the first UE inside the first Gap, and the resource configuration information is determined based on the first request information.

In some embodiments, the first request information and third request information are carried in different IEs in a same message, or the first request information and third request information are carried in a same IE in a same message, or the first request information and third request information are carried in different messages, where the third request information is used to request a second Gap from the network device, and the second Gap corresponds to a measurement task.

In some embodiments, the first configuration information and second configuration information are carried in different IEs in a same message, or the first configuration information and second configuration information are carried in a same IE in a same message, or the first configuration information and second configuration information are carried in different messages, where the second configuration information is received from the network device, the second configuration information is used to configure a second Gap, and the second Gap corresponds to a measurement task.

In some embodiments, the sending module 11 is further configured to: after sending the first configuration information to the first UE, in a case that the first UE is handed over from a first serving cell to a target serving cell, send the first request information to the target serving cell by using the first serving cell; and send the first configuration information to the first UE by using the target serving cell.

The network device 10 provided in this embodiment of the present disclosure can implement the processes of the foregoing method embodiment. To avoid repetition, details are not described herein again.

According to the network device provided in this embodiment of the present disclosure, first enabling information is sent to first UE, to indicate whether a first need configuration of a first Gap is enabled, that is, indicate whether a need of a Gap including at least one of N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the network device may send first configuration information to the first UE, to configure the first target Gap for the first UE. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

Figure 11:
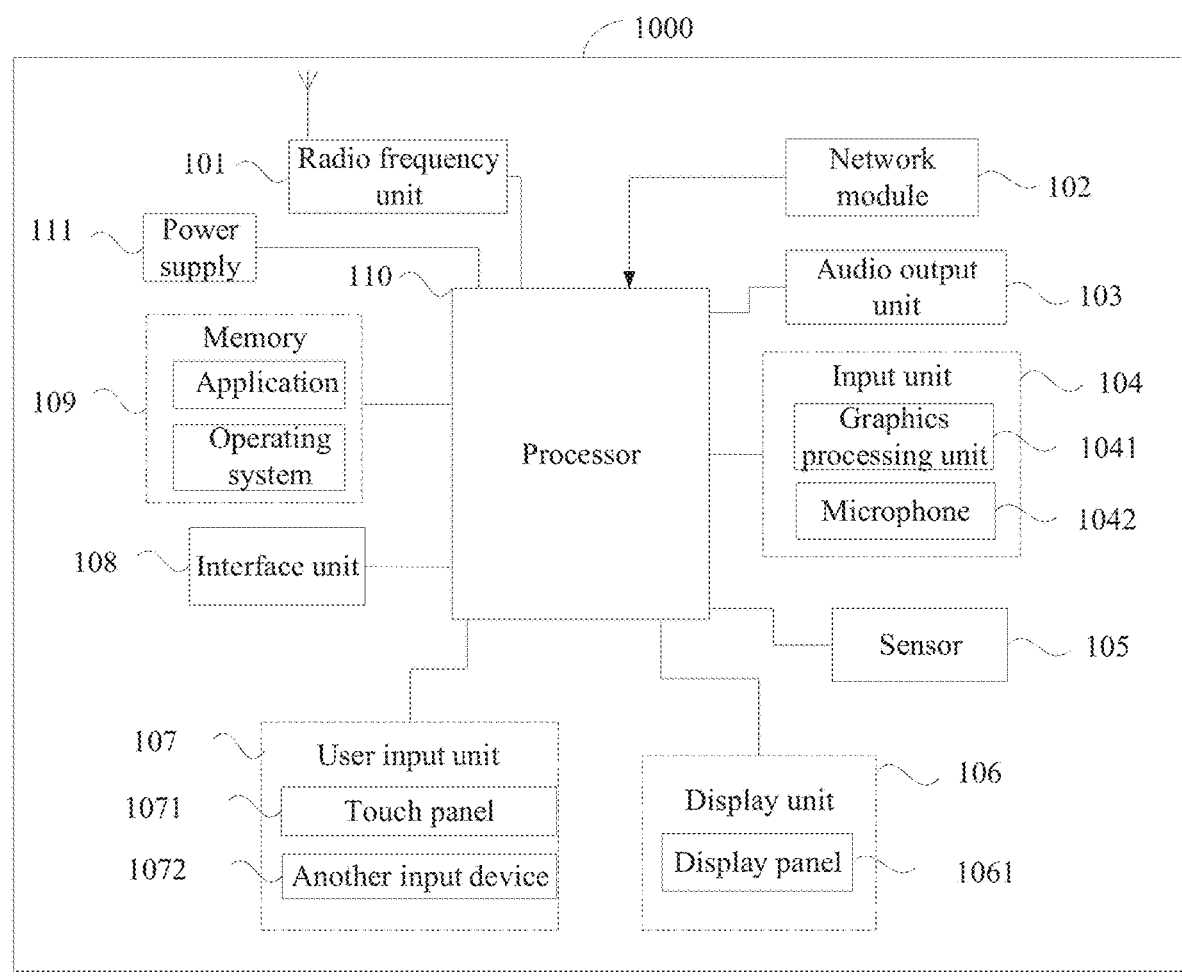
FIG. 11 is a second schematic structural diagram of UE according to an embodiment of the present disclosure.

FIG. 11 is a schematic structural diagram of hardware of a terminal device according to the embodiments of the present disclosure. UE 1000 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the UE 1000 shown in FIG. 11 constitutes no limitation on the terminal device, and the UE 1000 may include more or fewer components than those shown in the figure, or combine some components, or have a different component arrangement. In this embodiment of the present disclosure, the UE 1000 includes but is not limited to a mobile phone, a tablet computer, a notebook computer, a palmtop computer, an in-vehicle terminal, a wearable device, a pedometer, and the like.

In some embodiments, the foregoing UE 90 may be implemented by the UE 1000. For example, the receiving module 91 in the UE 90 may be implemented by the interface unit 108 in the UE 1000, and the sending module 92 in the UE 90 may be implemented by the radio frequency unit 101 in the UE 1000.

The interface unit 108 is configured to receive first enabling information from a network device, where the first enabling information is used to indicate whether a first need configuration of a first Gap is enabled, and the first Gap is a Gap including at least one of N Gap types; the radio frequency unit 101 is configured to send first request information to the network device in a case that the first enabling information received by the interface unit 108 indicates that the first need configuration is enabled, where the first request information is used to request a first target Gap, and a Gap type of the first target Gap is at least one of the N Gap types; and the interface unit 108 is further configured to receive first configuration information from the network device, where the first configuration information is used to configure the first target Gap.

According to the UE provided in this embodiment of the present disclosure, the first UE may receive the first enabling information from the network device, to learn whether the first need configuration of the first Gap is enabled, that is, indicate whether a need of the Gap including the at least one of the N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the first UE receives the first configuration information from the network device, to configure the first target Gap. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

It should be understood that, in this embodiment of the present disclosure, the radio frequency unit 101 may be configured to receive and send information or a signal in a call process. In some embodiments, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The UE 1000 provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide an audio output (for example, a call signal received voice, or a message received voice) related to a specific function implemented by the UE 1000. The audio output unit 103 includes a speaker, a buzzer, a telephone receiver, and the like.

The input unit 104 is configured to receive an audio signal or a video signal. The input unit 104 may include a Graphics Processing Unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The UE 1000 further includes at least one type of sensor 105, such as a light sensor, a motion sensor, and another sensor. In some embodiments, the light sensor may include an ambient light sensor and a proximity sensor. The ambient light sensor may adjust luminance of the display panel 1061 based on brightness of ambient light. The proximity sensor may turn off the display panel 1061 and/or backlight when the UE 1000 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a Liquid Crystal Display (LCD), an Organic Light-Emitting Diode (OLED), or the like.

The user input unit 107 may be configured to receive input digit or character information, and generate a key signal input related to a user setting and function control of the UE 1000. In some embodiments, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 110, and can receive and execute a command sent by the processor 110. In addition, the touch panel 1071 may be of a resistive type, a capacitive type, an infrared type, a surface acoustic wave type, or the like. The user input unit 107 may include another input device 1072 in addition to the touch panel 1071. In some embodiments, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. In FIG. 11, although the touch panel 1071 and the display panel 1061 are used as two independent parts to implement input and output functions of the UE 1000, in some embodiments, the touch panel 1071 and the display panel 1061 may be integrated to implement the input and output functions of the UE 1000. This is not in some embodiments limited herein.

The interface unit 108 is an interface for connecting an external apparatus with the UE 1000. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 108 may be configured to receive input (for example, data information and power) from an external apparatus and transmit the received input to one or more elements in the UE 1000 or may be configured to transmit data between the UE 1000 and an external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage component, a flash memory component, or another volatile solid-state storage component.

The processor 110 is a control center of the UE 1000, and connects all parts of the entire UE 1000 by using various interfaces and lines. By running or executing a software program and/or a module stored in the memory 109 and invoking data stored in the memory 109, the processor 110 performs various functions and/or data processing of the UE 1000, to perform overall monitoring on the UE 1000. The processor 110 may include one or more processing units. In some embodiments, an application processor and a modem processor may be integrated into the processor 110. The application processor mainly processes an operating system, a user screen, an application, and the like. The modem processor mainly processes wireless communications. It can be understood that, in some embodiments, the modem processor may not be integrated into the processor 110.

The UE 1000 may further include the power supply 111 (such as a battery) that supplies power to each component. In some embodiments, the power supply 111 may be logically connected to the processor 110 by using a power management system, so as to implement functions such as charging, discharging, and power consumption management by using the power management system.

In addition, the UE 1000 includes some function modules not shown, and details are not described herein.

Figure 12:
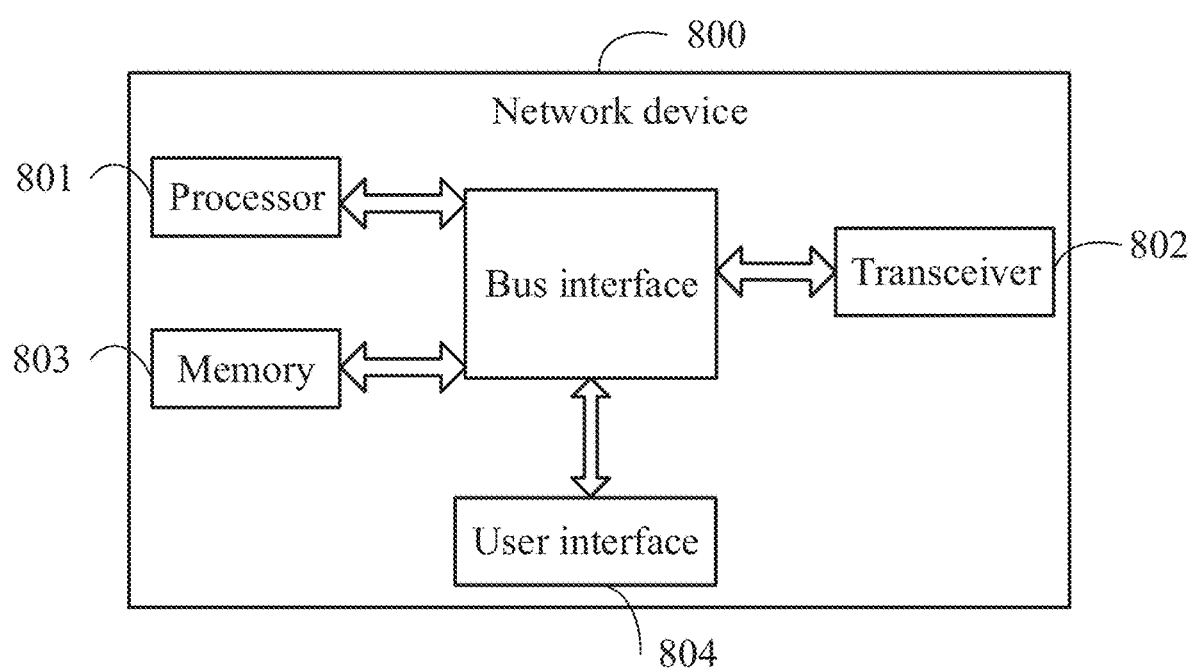
FIG. 12 is a second schematic structural diagram of a network device according to an embodiment of the present disclosure.

FIG. 12 is a schematic structural diagram of hardware of a network device according to an embodiment of the present disclosure. A network device 800 includes a processor 801, a transceiver 802, a memory 803, a user interface 804, and a bus interface.

The transceiver 802 is configured to send first enabling information to first user equipment UE, where the first enabling information is used to indicate whether a first need configuration of a first Gap is enabled, and the first Gap is a Gap including at least one of N Gap types; receive first request information from the first UE in a case that the first enabling information indicates that the first need configuration is enabled, where the first request information is used to request a first target Gap, and a Gap type of the first target Gap is at least one of the N Gap types; and send first configuration information to the first UE according to the first request information, where the first configuration information is used to configure the first target Gap.

According to the network device provided in this embodiment of the present disclosure, first enabling information is sent to first UE, to indicate whether a first need configuration of a first Gap is enabled, that is, indicate whether a need of a Gap including at least one of N Gap types is enabled. Then, in a case that the first enabling information indicates that the first need configuration is enabled, the first UE may request a first target Gap by sending first request information to the network device, that is, request the first target Gap whose Gap type is at least one of the N Gap types. Further, the network device may send first configuration information to the first UE, to configure the first target Gap for the first UE. In this way, diversified Gap negotiation and configuration between the network device and the first UE are implemented, that is, a Gap allocation mechanism can cover diversified Gap negotiation and configuration needs. Further, through enhanced Gap negotiation, a Gap need of a multi-SIM terminal is met, to avoid service interruption of the multi-SIM terminal and more effectively use network resources, thereby avoiding a resource waste.

In this embodiment of the present disclosure, in FIG. 12, a bus architecture may include any quantity of interconnected buses and bridges, and in some embodiments links various circuits of one or more processors represented by the processor 801 and a memory represented by the memory 803. The bus architecture may further link various other circuits such as a peripheral device, a voltage regulator, and a power management circuit. A bus interface provides an interface. The transceiver 802 may be a plurality of components. To be specific, the transceiver 802 includes a transmitter and a receiver, and provides a unit configured to communicate with various other apparatuses on a transmission medium. For different user equipment, a user interface 804 may be an interface that can externally or internally connect to a needed device, and the connected device includes but is not limited to a keypad, a display, a loudspeaker, a microphone, and a joystick. The processor 801 is responsible for bus architecture management and general processing. The memory 803 may store data used by the processor 801 when the processor 801 performs an operation.

In addition, the network device 800 further includes some function modules not shown, and details are not described herein.

For example, an embodiment of the present disclosure further provides UE, including a processor, a memory, and a computer program that is stored in the memory and that can run on the processor. When the computer program is executed by the processor, the processes of the Gap configuration method in the foregoing embodiment are implemented and a same technical effect can be achieved. To avoid repetition, details are not described herein again.

For example, an embodiment of the present disclosure further provides a network device, including a processor, a memory, and a computer program that is stored in the memory and that can run on the processor. When the computer program is executed by the processor, the processes of the Gap configuration method in the foregoing embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the Gap configuration method in the foregoing embodiment are implemented and a same technical effect can be achieved. To avoid repetition, details are not described herein again. The computer-readable storage medium includes a Read-Only Memory (ROM for short), a Random Access Memory (RAM for short), a magnetic disk, an optical disc, and the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

The computer software product is stored in a storage medium (such as a ROM/RAM, a magnetic disk, or an optical disc), and includes several instructions for instructing a terminal device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A Gap configuration method, comprising:
receiving, by first User Equipment (UE), first enabling information from a network device, wherein the first enabling information is used to indicate whether a first need configuration of one of one or more first Gaps is enabled, the one or more first Gaps is one or more gaps comprising at least one of N Gap types, and N is a positive integer;
sending, by the first UE, first request information to the network device in a case that the first enabling information indicates that the first need configuration is enabled, wherein the first request information is used to request one of one or more first target Gaps, and a Gap type of the one or more first target Gaps is at least one of the N Gap types; and
receiving, by the first UE, first configuration information from the network device, wherein the first configuration information is used to configure the one or more first target Gaps.

2. The method according to claim 1, wherein the one or more first Gaps comprises at least one of the following:
a Gap for a terminal device;
a Gap for the first UE;
a Gap for second UE;
a first time Gap corresponding to data receiving and sending;
a capability-based Gap;
a configuration-based Gap;
a Multiple-Input Multiple-Output (MIMO) Gap;
a Carrier Aggregation (CA) Gap;
a second time Gap corresponding to uplink data sending;
a third time Gap corresponding to downlink data sending;
a Gap corresponding to a Master Cell Group (MCG) of the first UE; and
a Gap corresponding to a Secondary Cell Group (SCG) of the first UE, wherein
the second UE and the first UE are UE controlled by a same terminal device.

3. The method according to claim 2, wherein
the Gap corresponding to the MCG comprises at least one of the following: the first time Gap, the capability-based Gap, the configuration-based Gap, the MIMO Gap, the CA Gap, the second time Gap, and the third time Gap; and
the Gap corresponding to the SCG comprises at least one of the following: the first time Gap, the capability-based Gap, the configuration-based Gap, the MIMO Gap, the CA Gap, the second time Gap, and the third time Gap.

4. The method according to claim 2, wherein one of the N Gap types corresponds to at least one task, and all or a part of the at least one task is different from a measurement task.

5. The method according to claim 4, wherein
a task corresponding to the Gap for the terminal device comprises: executing, inside the Gap, tasks of a plurality of UEs controlled by the terminal device;
a task corresponding to the Gap for the first UE comprises: executing a task of the first UE inside the Gap;
a task corresponding to the Gap for the second UE comprises: executing a task of the second UE inside the Gap;
a task corresponding to the first time Gap comprises: stopping service data receiving and sending inside the Gap;
a task corresponding to the capability-based Gap comprises: using a first capability outside the Gap, and using a second capability inside the Gap, wherein the first capability is greater than the second capability;
a task corresponding to the configuration-based Gap comprises: using a first configuration outside the Gap, and using a second configuration inside the Gap, wherein the first configuration is greater than the second configuration;
a task corresponding to the MIMO Gap comprises: reducing a quantity of MIMO layers inside the Gap;
a task corresponding to the CA Gap comprises: reducing a CA quantity inside the Gap;
a task corresponding to the second time Gap comprises: stopping uplink data sending inside the Gap; or
a task corresponding to the third time Gap comprises: stopping downlink data receiving inside the Gap.

6. The method according to claim 1, wherein after the sending, by the first UE, first request information to the network device, the method further comprises:
sending, by the first UE, second request information to the network device in a case that the first request information changes, wherein
the case that the first request information changes comprises at least one of the following: a task corresponding to the first target Gap changes, a configuration of a second Gap changes, or a Radio Resource Control (RRC) configuration changes; and
the second request information is used to request a second target Gap, a Gap type of the second target Gap is at least one of the N Gap types, and the second Gap corresponds to a measurement task.

7. The method according to claim 1, wherein the first request information is carried in a target message, wherein
the target message is any one of the following: a Radio Resource Control Resume Complete (RRC Resume Complete) message, a Radio Resource Control Reconfiguration Complete (RRC Reconfiguration Complete) message, or a User Equipment Assistance Information (UE Assistance Information) message.

8. The method according to claim 1, wherein the first request information comprises at least one of the following: first indication information used to indicate whether the first UE needs a Gap, second indication information used to indicate a Gap type of a Gap requested by the first UE, third indication information used to indicate a task corresponding to the Gap requested by the first UE, or Gap time information of the Gap requested by the first UE.

9. The method according to claim 8, wherein the Gap time information comprises at least one of the following: start moment of a Gap, Gap duration, or Gap cycle information.

10. The method according to claim 8, wherein the task corresponding to the requested Gap comprises at least one of the following: a task of a terminal device, a task of the first UE, a task of second UE, an idle-state task, a signaling process, or another service, wherein the second UE and the first UE are UEs controlled by a same terminal device.

11. The method according to claim 1, wherein after the receiving, by first UE, first enabling information from a network device, the method further comprises:
receiving, by the first UE, third enabling information from the network device, wherein
the third enabling information is used to indicate at least one of the following: whether the first need configuration is enabled, or whether a second need configuration of a second Gap is enabled; and
the second Gap corresponds to a measurement task.

12. The method according to claim 1, wherein the first configuration information comprises at least one of the following: Gap time information of the first Gap or resource configuration information, wherein
the resource configuration information is used to indicate a resource configuration of the first UE inside the first Gap, and the resource configuration information is determined based on the first request information.

13. The method according to claim 1, wherein
the first request information and third request information are carried in different Information Elements (IEs) in a same message, or the first request information and third request information are carried in a same IE in a same message, or the first request information and third request information are carried in different messages, wherein the third request information is used to request a second Gap from the network device, and the second Gap corresponds to a measurement task.

14. The method according to claim 1, wherein
the first configuration information and second configuration information are carried in different IEs in a same message, or the first configuration information and second configuration information are carried in a same IE in a same message, or the first configuration information and second configuration information are carried in different messages, wherein
the second configuration information is received from the network device, the second configuration information is used to configure a second Gap, and the second Gap corresponds to a measurement task.

15. A Gap configuration method, comprising:
sending, by a network device, first enabling information to first User Equipment (UE), wherein the first enabling information is used to indicate whether a first need configuration of one of one or more first Gaps is enabled, the one or more first Gaps is one or more gaps comprising at least one of N Gap types, and N is a positive integer;
receiving, by the network device, first request information from the first UE in a case that the first enabling information indicates that the first need configuration is enabled, wherein the first request information is used to request one of one or more first target Gaps, and a Gap type of the one or more first target Gaps is at least one of the N Gap types; and
sending, by the network device, first configuration information to the first UE according to the first request information, wherein the first configuration information is used to configure the first target Gap.

16. The method according to claim 15, wherein the first Gap comprises at least one of the following:
a Gap for a terminal device;
a Gap for the first UE;
a Gap for second UE;
a first time Gap corresponding to data receiving and sending;
a capability-based Gap;
a configuration-based Gap;
a Multiple-Input Multiple-Output (MIMO) Gap;
a Carrier Aggregation (CA) Gap;
a second time Gap corresponding to uplink data sending;
a third time Gap corresponding to downlink data sending;
a Gap corresponding to a Master Cell Group (MCG) of the first UE; or
a Gap corresponding to a Secondary Cell Group (SCG) of the first UE, wherein
the second UE and the first UE are UEs controlled by a same terminal device.

17. The method according to claim 16, wherein
the Gap corresponding to the MCG comprises at least one of the following: the first time Gap, the capability-based Gap, the configuration-based Gap, the MIMO Gap, the CA Gap, the second time Gap, or the third time Gap; and
the Gap corresponding to the SCG comprises at least one of the following: the first time Gap, the capability-based Gap, the configuration-based Gap, the MIMO Gap, the CA Gap, the second time Gap, or the third time Gap.

18. The method according to claim 16, wherein one of the N Gap types corresponds to at least one task, and all or a part of the at least one task is different from a measurement task.

19. The method according to claim 18, wherein
a task corresponding to the Gap for the terminal device comprises: executing, inside the Gap, tasks of a plurality of UEs controlled by the terminal device;
a task corresponding to the Gap for the first UE comprises: executing a task of the first UE inside the Gap;
a task corresponding to the Gap for the second UE comprises: executing a task of the second UE inside the Gap;
a task corresponding to the first time Gap comprises: stopping service data receiving and sending inside the Gap;
a task corresponding to the capability-based Gap comprises: using a first capability outside the Gap, and using a second capability inside the Gap, wherein the first capability is greater than the second capability;
a task corresponding to the configuration-based Gap comprises: using a first configuration outside the Gap, and using a second configuration inside the Gap, wherein the first configuration is greater than the second configuration;
a task corresponding to the MIMO Gap comprises: reducing a quantity of MIMO layers inside the Gap;
a task corresponding to the CA Gap comprises: reducing a CA quantity inside the Gap;
a task corresponding to the second time Gap comprises: stopping uplink data sending inside the Gap; or
a task corresponding to the third time Gap comprises: stopping downlink data receiving inside the Gap.

20. User Equipment (UE), wherein the UE is a first UE and comprises:
a memory storing computer-readable instructions; and
a processor coupled to the memory and configured to execute the computer-readable instructions, wherein the computer-readable instructions, when executed by the processor, cause the processor to perform operations comprising:
receiving, by the first UE, first enabling information from a network device, wherein the first enabling information is used to indicate whether a first need configuration of one of one or more first Gaps is enabled, the one or more first Gaps is one or more gaps comprising at least one of N Gap types, and N is a positive integer;
sending, by the first UE, first request information to the network device in a case that the first enabling information indicates that the first need configuration is enabled, wherein the first request information is used to request one of one or more first target Gaps, and a Gap type of the one or more first target Gaps is at least one of the N Gap types; and
receiving, by the first UE, first configuration information from the network device, wherein the first configuration information is used to configure the one or more first target Gaps.

* * * * *